US006791572B1

(12) United States Patent
Cloney et al.

(10) Patent No.: US 6,791,572 B1
(45) Date of Patent: Sep. 14, 2004

(54) GENERATING MEDIA OUTPUT DURING BIOS BOOT-UP

(75) Inventors: Peter Cloney, San Jose, CA (US); Wolfgang Dunsdon, Santa Clara, CA (US); Glenn E. Jystad, Dove Canyon, CA (US); Myungseok Kim, Irvine, CA (US)

(73) Assignee: Phoenix Technologies Ltd., Milpitas, CA (US)

( * ) Notice: Subject to any disclaimer, the term of this patent is extended or adjusted under 35 U.S.C. 154(b) by 0 days.

(21) Appl. No.: 09/458,613

(22) Filed: Dec. 10, 1999

Related U.S. Application Data

(63) Continuation-in-part of application No. 09/336,509, filed on Jun. 18, 1999.

(51) Int. Cl.$^7$ .......................... G06F 17/00; G06F 9/445; G06T 1/00
(52) U.S. Cl. ...................... 345/619; 418/474; 418/501; 418/522; 418/530; 713/1; 713/2; 707/104.1
(58) Field of Search ................................. 345/418, 473, 345/619, 621, 474, 636, 581, 501, 503, 522, 530, 547, 551, 553, 556, 537, 559; 711/1; 703/24; 713/1, 2; 707/103–104.1; 700/83, 5, 2, 19, 87, 88; 709/208, 221, 321; 714/723

(56) References Cited

U.S. PATENT DOCUMENTS

| | | | | |
|---|---|---|---|---|
| 5,305,437 A | * | 4/1994 | Fritze et al. ................ | 345/520 |
| 5,307,451 A | | 4/1994 | Clark | |
| 5,414,809 A | | 5/1995 | Hogan et al. | |
| 5,719,761 A | * | 2/1998 | Gatti ........................ | 364/130 |
| 5,802,361 A | * | 9/1998 | Wang et al. ................ | 345/600 |
| 5,812,394 A | * | 9/1998 | Lewis et al. ................ | 364/146 |
| 5,818,444 A | | 10/1998 | Alimpich et al. | |
| 5,977,978 A | * | 11/1999 | Carey ........................ | 345/419 |
| 5,978,507 A | * | 11/1999 | Shackleton et al. ......... | 382/195 |
| 5,982,383 A | * | 11/1999 | Kumar ....................... | 345/440 |
| 5,995,916 A | * | 11/1999 | Nixon et al. ................ | 702/182 |
| 6,026,433 A | * | 2/2000 | D'Arlach .................... | 709/217 |
| 6,049,871 A | | 4/2000 | Silen et al. | |
| 6,053,951 A | * | 4/2000 | McDonald .................... | 717/1 |
| 6,148,387 A | * | 11/2000 | Galasso et al. ............. | 711/203 |
| 6,182,083 B1 | * | 1/2001 | Scheifler et al. ........... | 707/103 |
| 6,195,095 B1 | | 2/2001 | Beer et al. | |
| 6,195,591 B1 | * | 2/2001 | Nixon et al. ................ | 700/83 |
| 6,232,974 B1 | * | 5/2001 | Horvitz ...................... | 345/419 |
| 6,237,045 B1 | * | 5/2001 | Enomoto ..................... | 709/328 |
| 6,243,172 B1 | * | 6/2001 | Gauthier et al. ........... | 358/1.18 |
| 6,262,729 B1 | * | 7/2001 | Marcos ....................... | 345/335 |
| 6,272,627 B1 | | 8/2001 | Mann | |
| 6,275,935 B1 | * | 8/2001 | Barlow ....................... | 713/182 |
| 6,304,272 B1 | | 10/2001 | Schanel et al. | |
| 6,373,498 B1 | * | 4/2002 | Abgrall ...................... | 345/619 |
| 6,446,139 B1 | * | 9/2002 | Leung et al. ................. | 710/1 |
| 6,449,682 B1 | * | 9/2002 | Toorians ..................... | 711/100 |
| 6,452,599 B1 | * | 9/2002 | Campbell .................... | 345/522 |
| 6,487,656 B1 | * | 11/2002 | Kim et al. ................... | 713/2 |
| 6,519,659 B1 | * | 2/2003 | Stevens ....................... | 710/15 |
| 6,542,160 B1 | * | 4/2003 | Abgrall ...................... | 345/537 |

OTHER PUBLICATIONS

BIOS is used to Determine Processing Speed by Retrieving Device Parameters for Devices Other Than Processors Since BIOS can be used, to Determine Various Other Device Parameters (i.e., RAM, Mass Storage Devices, Video Graphics Cards, Sound Cards, etc.*

* cited by examiner

*Primary Examiner*—Matthew C. Bella
*Assistant Examiner*—Wesner Sajous

(57) ABSTRACT

The present invention is a method and apparatus to display information. The method comprises retrieving a first value representative of a first device parameter, and detecting a second value representative of a second device parameter. A template corresponding to a graphic object is retrieved from a storage. A graphic attribute that characterizes the graphic object is generated from the template. The first and second values displayed and an image is generated from the graphic object according to the graphic attribute.

60 Claims, 19 Drawing Sheets

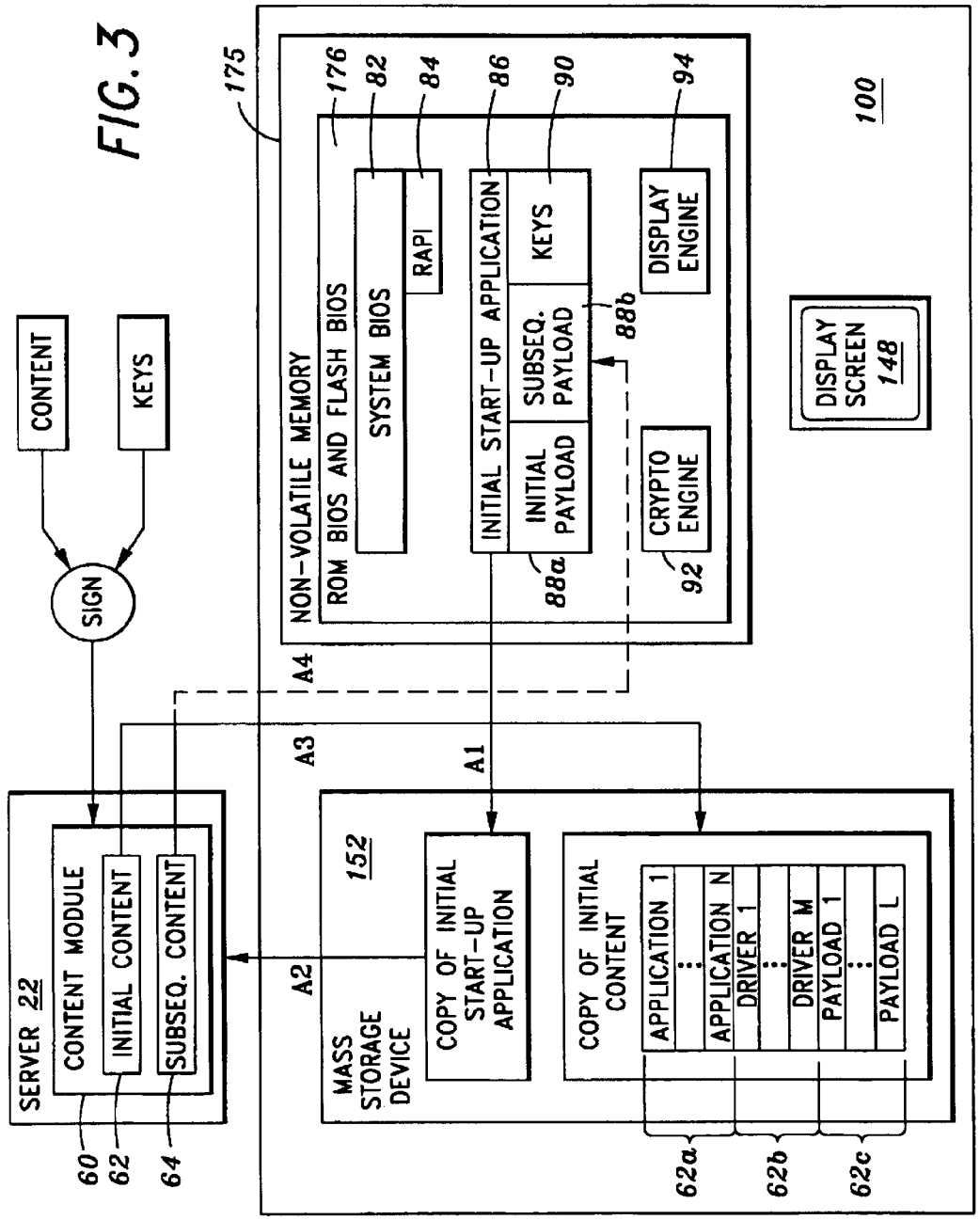

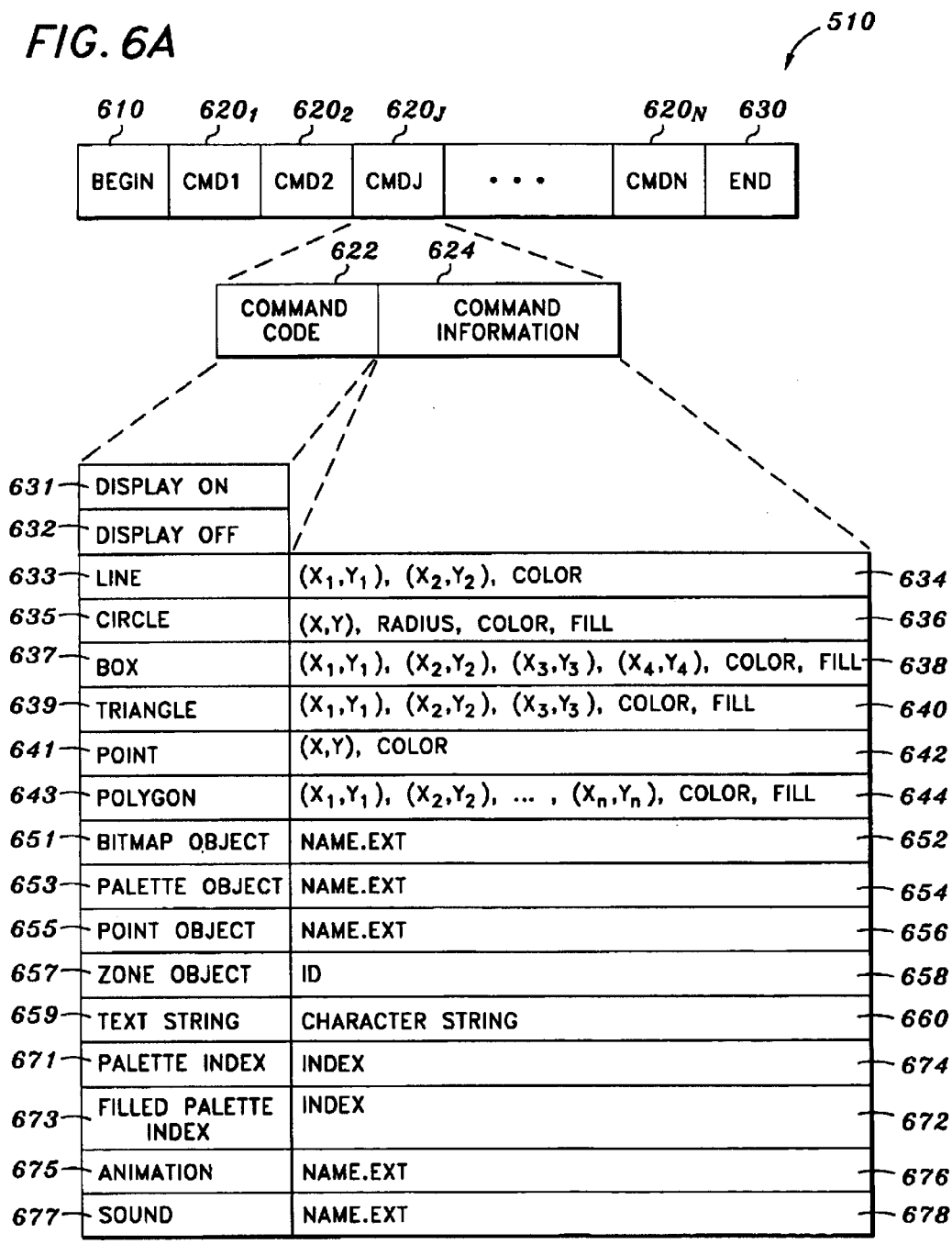

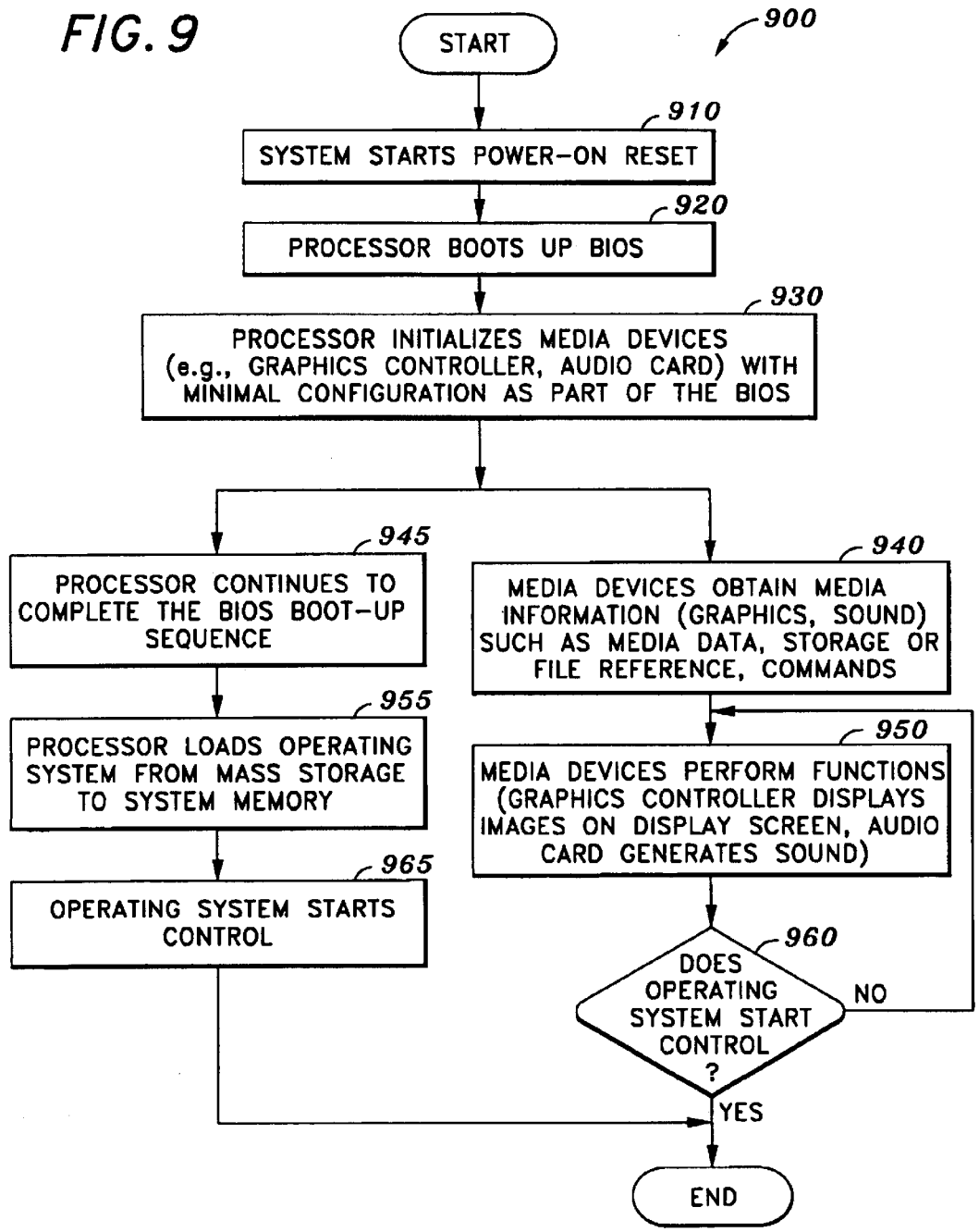

FIG. IIB

| KEYWORD | OBJECT NAME |
|---|---|
| PROCESSOR TYPE A | NAME.EXT 1 |
| PROCESSOR TYPE B | NAME.EXT 2 |
| ⋮ | ⋮ |
| PROCESSOR TYPE M | NAME.EXT 3 |
|  |  |

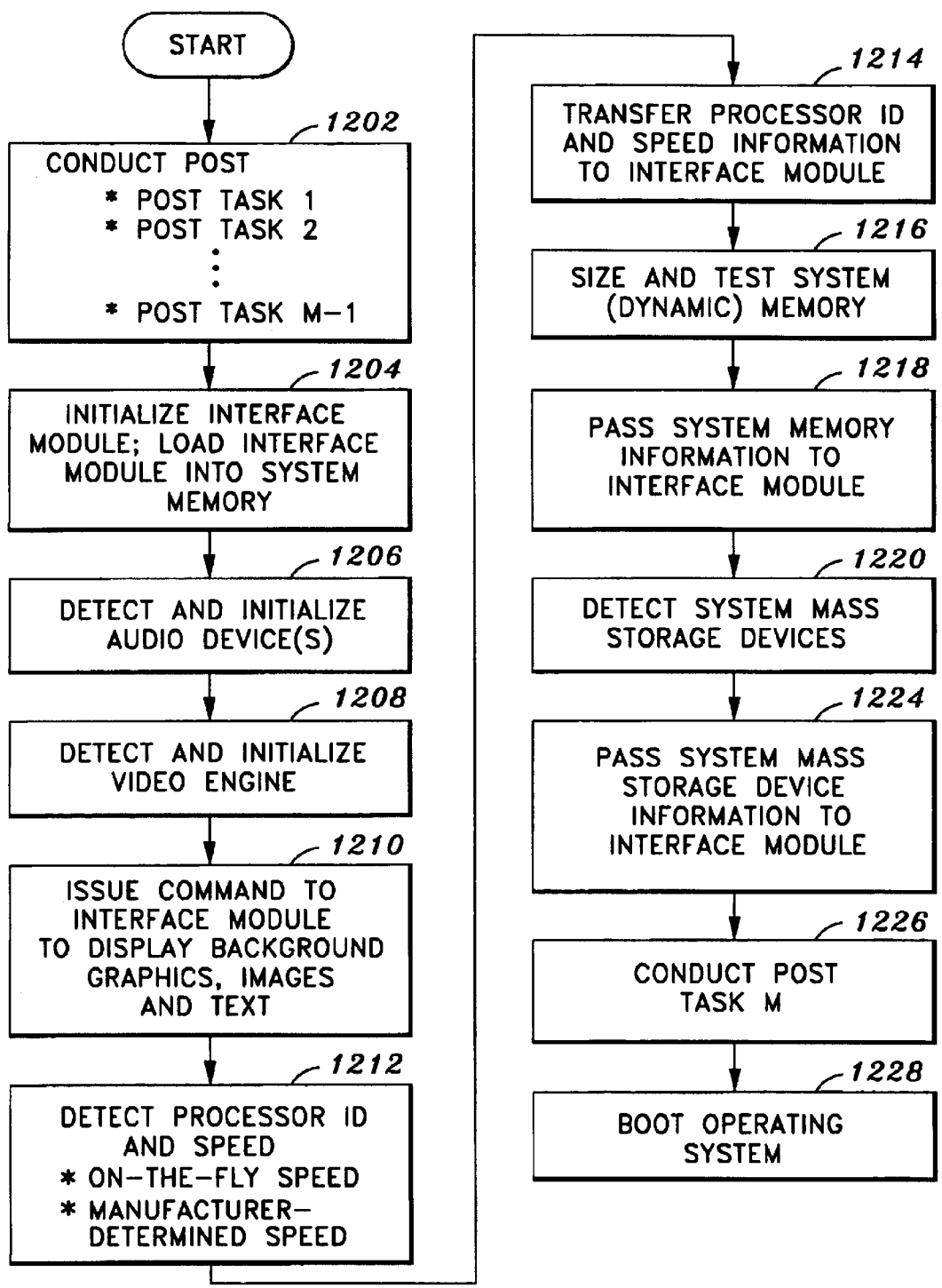

GENERATING MEDIA OUTPUT DURING BIOS BOOT-UP

The present application is a continuation-in-part application of pending U.S. application Ser. No. 09/336,509, filed Jun. 18, 1999.

BACKGROUND

1. Field of the Invention

This invention relates to multimedia. In particular, the invention relates to graphic display and sound generation from firmware. The invention further relates to display of graphical display of system and/or system device information (e.g., device parameters).

2. Description of Related Art

Generating a media output such as an image of a graphic object can be performed in a number of ways. If the graphic object is represented by bit-mapped graphic data, a graphic engine can read the bit-mapped pixels directly and renders the appropriate colors according to the pixel values. If the graphic object is formed by a series of vector operations, the graphic controller can perform vector-generating operations sequentially.

Although the above methods can be used in a traditional graphics environment, they may not be suitable in applications where highly organized data structures are required. One example of such applications is the display of graphics during the basic input and output system (BIOS) boot-up. In such applications, it is preferable that the image of the graphic object to be generated as fast as possible. Furthermore, the image content may change frequently as the system updates its database.

Traditional methods usually generate the image directly from the graphic object. These methods suffer a number of drawbacks. First, it is difficult to update the graphic objects, especially when only a portion of the image set needs to be updated. Second, they require more storage to organize the graphic object. Third, they do not provide a flexible way to render the image such as mixing different image characteristics (e.g., color, layout).

Therefore there is a need in the technology to provide a simple and efficient method to generate a media output.

Currently, if additional functionalities are being added to the system BIOS, significant changes have to be implemented. In particular, the system BIOS code has to be significantly revised. Accordingly, there is a need to provide additional functionalities to system BIOS without having to significantly alter the system BIOS code. There is also a further need in the industry to provide and display system device information simply and efficiently.

In addition, device parameter such as processor performance information and memory size information, are traditionally display in textual format. Such system device information is typically determined at the time of manufacture. During the boot process, the system device information (e.g., device parameters) determined at the time of manufacture is detected and/or retrieved by the system BIOS and displayed in textual format. Such information is difficult to view as the user has to sort through lines o text to locate the desired information. There is thus a further need in the industry to provide and display system device information, such as device parameters, simply and efficiently.

SUMMARY

The present invention is a method and apparatus to display information. The method comprises retrieving a first value representative of a first device parameter, and detecting a second value representative of a second device parameter. A template corresponding to a graphic object is retrieved from a storage. A graphic attribute that characterizes the graphic object is generated from the template. The first and second values displayed and an image is generated from the graphic object according to the graphic attribute.

BRIEF DESCRIPTION OF THE DRAWINGS

The features and advantages of the present invention will become apparent from the following detailed description of the present invention in which:

FIG. 3 illustrates a logical diagram of one embodiment of the invention.

FIG. 6A is a diagram illustrating a template for the graphic object according to one embodiment of the invention.

FIG. 9 is a flowchart illustrating one embodiment of a process to display information in accordance with the principles of the invention.

FIG. 11B is a chart illustrating one embodiment of a processor mapping table.

FIG. 12 is a flowchart illustrating one embodiment of a process to display information in accordance with the principles of the invention.

Description

Figure 1:
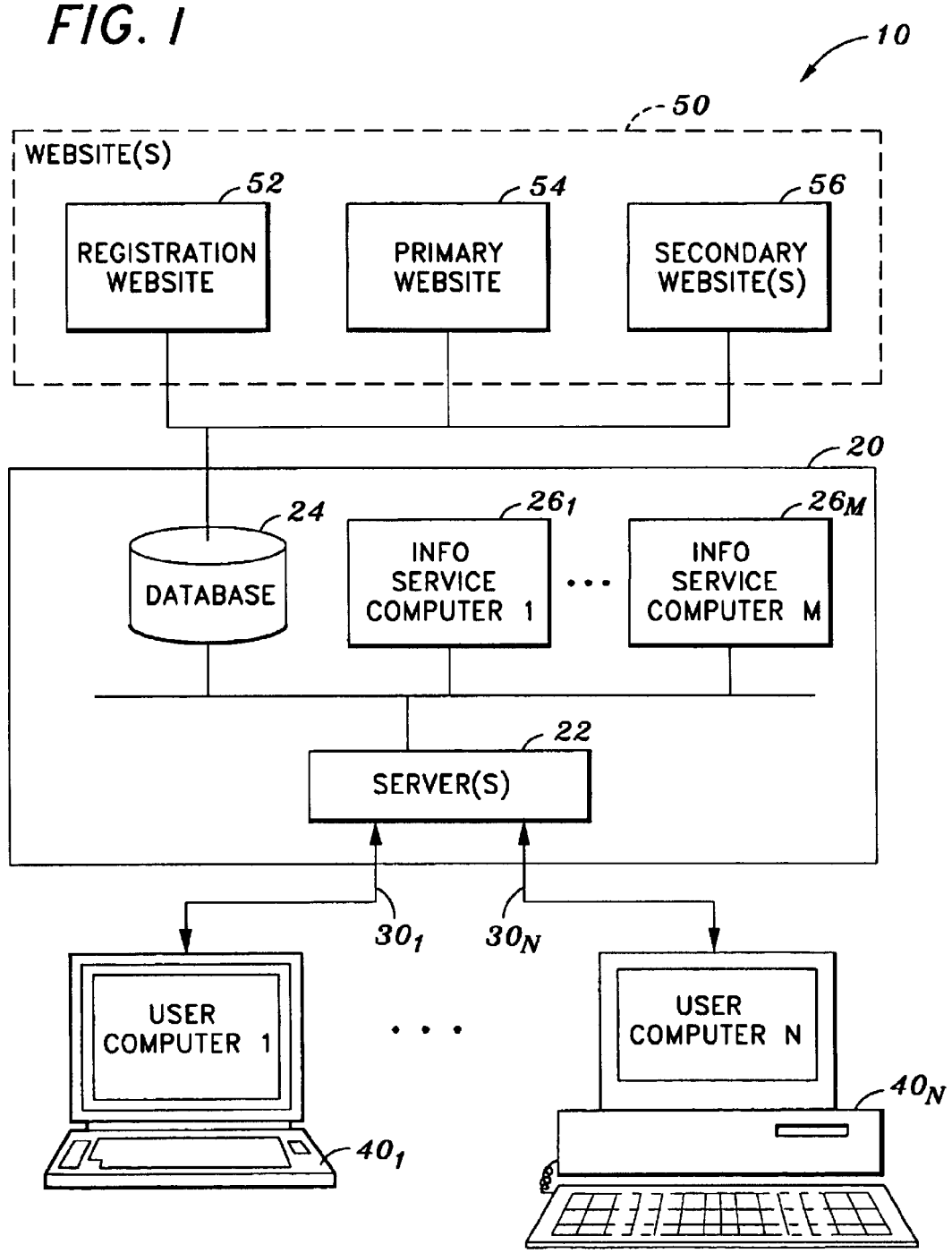
FIG. 1 is a system block diagram of one embodiment of an information distribution system in which the apparatus and method of the invention is used.

The present invention is a method and apparatus to generate a media output during BIOS boot-up. In one embodiment, a template contains graphic attributes characterizing the graphic objects. The template and the graphic objects are stored in a storage. The template is retrieved, scanned, and parsed to generate the graphic attributes. The graphic objects are retrieved based in the attributes. An image of the graphic objects is generated using the graphic attributes. Animation and sound can be generated. The technique provides an efficient means to display images of graphic objects such as advertisement banners, textual items during boot-up or power-on reset. In another embodiment, a media device is initialized at the early stage of the BIOS boot-up. Then a media operation is performed while the normal BIOS tasks are being performed.

Another aspect of the invention also provides an efficient technique to generate a media output. The media output includes system device information, including device parameters, that is generated on-the-fly, and such information is displayed simply and efficiently. The technique generates a graphic attribute characterizing the graphic object from a template. The image is then generated from the graphic object using the graphic attribute. In another embodiment, a media device such as a graphics controller or an audio card is initialized during the early BIOS boot-up. Then a media operation is performed while the normal BIOS tasks are being performed.

A further aspect of the invention is a method and apparatus to provide functionalities to system BIOS in a simple, elegant and flexible manner. An interface module is provided, which enables various parties such as PC system manufacturers and motherboard manufacturers to provide additional system BIOS functionalities with minimal impact to the system BIOS code. The method comprises interfacing an interface module to the system BIOS, and receiving a request from the system BIOS to perform a task. System device information, such as values representative of device parameters, associated with he task is received from the system BIOS. The interface module translates the system device information to provide translated information. The translated information is then transferred to a corresponding module.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention.

Definitions

As discussed herein, a "computer system" is a product including circuitry capable of processing data. The computer system may include, but is not limited to, general purpose computer systems (e.g., server, laptop, desktop, palmtop, personal electronic devices, etc.), personal computers (PCs), hard copy equipment (e.g., printer, plotter, fax machine, etc.), banking equipment (e.g., an automated teller machine), and the like. An infomediary is a web site that provides information on behalf of producers of goods and services, supplying relevant information to businesses about products and/or services offered by suppliers and other businesses. Content refers to application programs, driver programs, utility programs, the payload, etc., and combinations thereof, as well as graphics, informational material (articles, stock quotes, etc.) and the like, either singly or in any combination. "Payload" refers to messages with graphics or informational material (such as, articles, stock quotes, etc.) and may include files or applications. In one embodiment, it is transferred at a predetermined time to the system's mass storage media. In addition, a "communication link" refers to the medium or channel of communication. The communication link may include, but is not limited to, a telephone line, a modem connection, an Internet connection, an Integrated Services Digital Network ("ISDN") connection, an Asynchronous Transfer Mode (ATM) connection, a frame relay connection, an Ethernet connection, a coaxial connection, a fiber optic connection, satellite connections (e.g. Digital Satellite Services, etc.), wireless connections, radio frequency (RF) links, electromagnetic links, two way paging connections, etc., and combinations thereof.

In addition, the loading of an operating system ("OS") refers to the initial placement of the operating system bootstrap loader. In one embodiment, during the OS load, a sector of information is typically loaded from a hard disk into the system memory. Alternatively, the bootstrap loader is loaded from a network into system memory. An OS "boot" refers to the execution of the bootstrap loader. This places the OS in control of the system. Some of the actions performed during the OS boot include system configuration, device detection, loading of drivers and user logins. OS runtime refers to the completion of the boot phase and the beginning of the execution of applications by the OS. In one embodiment, during OS runtime, the OS interacts with the user to execute and/or run applications.

Power On Self Test (POST) refers to the instructions that are executed to configure and test the system hardware prior to loading an OS.

System Overview

A description of an exemplary system, which incorporates embodiments of the present invention, is hereinafter described.

FIG. 1 shows a system block diagram of one embodiment of an information distribution system 10 in which the apparatus and method of the invention is used. The system 10 relates to providing an infomediary. It involves the construction and maintenance of a secure and private repository of Internet user and system profiles, collected primarily from warranty service registrations, Internet service registrations, system profiles, and user preferences. Initially, this information is used to register the user with the manufacturers of purchased hardware and software products, and with the providers of on-line or other services. Over time, the user data is used to create a user profile and notify users of relevant software updates and upgrades, to encourage on-line purchases of related products, and to enable one-to-one customized marketing and other services.

In one embodiment, two software modules are used to implement various embodiments of the invention. One is resident on a user's system, and is used to access a predetermined web site. For example, in one embodiment, the operating system and Basic Input and Output System (BIOS) are pre-installed on a computer system, and when the computer system is subsequently first powered up, an application, referred to for discussion purposes as the first software module (in one embodiment, the first software module is the initial start-up application (ISUA), which will be described in the following sections), will allow the launching of one or more executable programs in the pre-boot environment. In one embodiment, the first software module facilitates the launching of one or more executable programs prior to the loading, booting, execution and/or running of the OS. In one embodiment, the user is encouraged to select the use of such a program (i.e., the use of the first software module), and in alternative embodiments, the program is automatically launched. The program(s) contained in the first software module enables tools and utilities to run at an appropriate time, and with proper user authorization, also allow the user to download a second software module that includes drivers, applications and additional payloads through the Internet connection on the PC. The programs may also provide for remote management of the system if the OS fails to launch successfully.

Once the second software module has been delivered, it may become memory resident, and may disable the transferred copy of the first software module. The original copy of the first software module still residing in the system's non-volatile memory remains idle until the second software module fails to function, becomes corrupted or is deleted, upon which a copy of the original first software module is again transferred as described above. The second software module may include an application that connects the user to a specific server on the Internet and directs the user to a predetermined web site to seek authorization to down load further subscription material. The second software module may also include content that is the same or similar to the content of the first software module.

In one embodiment, the system may also include an initial payload that is stored in Read Only Memory BIOS (ROM BIOS). In one embodiment, the initial payload is part of the first software module (e.g., the ISUA). In an alternative embodiment, the initial payload is stored as a module in ROM BIOS, separate from the first software module. In one embodiment, the initial payload is launched from ROM BIOS and displayed on the screen after the Power On Self Test (POST) but prior to the booting, loading and/or execution of the OS. This may occur at a predetermined time, such as when the system is being manufactured, assembled and tested, or when the end user first activates the system. In an alternate embodiment, this initial payload is copied to a predetermined location (such as the system's hard disk) at a predetermined time, such as when the system is being manufactured, assembled and tested, or when the end user first activates the system. Once copied, the payload executes after POST but prior to operation of the OS, and may display graphics, advertisements, animation, Joint Photographic Experts Group (JPEG)/Moving Picture Experts Group (MPEG) formatted material on the screen. When additional programs and/or payloads are delivered (via the Internet or other outside connection), the display screen may be used to provide customized screens in the form of messages or graphics prior to and during booting of the OS. In addition, executable programs delivered in the first software module, as well as subsequent programs (such as the second software module) downloaded from the web site, may be used to survey the PC to determine various types of devices, drivers, and applications installed. In one embodiment, as described in co-pending U.S. patent application Ser. No. 09/336,289 entitled "Method and Apparatus for Automatically Installing And Configuring Software on a Computer" incorporated herein by reference, the first software module is used to identify and to automatically create shortcuts and/or bookmarks for the user. The programs downloaded from the website may include software that collects and maintains a user profile based on the user's preferences. Such information may be provided to the infomediary, which subsequently forwards portions of the information and/or compiled data based on the information to suppliers and other businesses to obtain updates or revisions of information provided by the suppliers and other businesses.

Referring to FIG. 1, the information distribution system 10 comprises a service center 20 that is connected over one or more communications links $30_1$–$30_N$ to one or more user computer systems $40_1$–$40_N$ ("40"). The service center 20 includes one or more servers 22, one or more databases 24, and one or more computers $26_1$–$26_M$. The one or more computers $26_1$–$26_M$ are capable of simultaneous access by a plurality of the user computer systems $40_1$–$40_N$. If a plurality of computers are used, then the computers $26_1$–$26_M$ may be connected by a local area network (LAN) or any other similar connection technology. However, it is also possible for the service center 20 to have other configurations. For example, a smaller number of larger computers (i.e. a few mainframe, mini, etc. computers) with a number of internal programs or processes running on the larger computers capable of establishing communications links to the user computers.

The service center 20 may also be connected to a remote network 50 (e.g., the Internet) or a remote site (e.g., a satellite, which is not shown in FIG. 1). The remote network 50 or remote site allows the service center 20 to provide a wider variety of computer software, content, etc. that could be stored at the service center 20. The one or more databases 24 connected to the service center computer(s), e.g., computer $26_1$, are used to store database entries consisting of computer software available on the computer(s) 26. In one embodiment, each user computer $40_1$–$40_N$ has its own secure database (not shown), that is not accessible by any other computer. The communication links $30_1$–$30_N$ allow the one or more user computer systems $40_1$–$40_N$ to simultaneously connect to the computer(s) $26_1$–$26_M$. The connections are managed by the server 22.

After a user computer system 40 establishes two-way communications with the information service computer 26, the content is sent to the user computer system 40 in a manner hereinafter described. The downloaded content includes an application that surveys the user and/or the user computer system's hardware and/or software to develop a user profile as well as a profile of the user's system. The information gathered from the user and/or user's computer system is subsequently provided to the service center 20, which provides additional content to the user computer 40 based on the user and system profile. The database entries from the database connected to the service computer 26 contain information about computer software, hardware, and third party services and products that are available to a user. Based on the user and/or system profile, the content is further sent to the user computer for display. The content may also include a summary of information such as the availability of patches and fixes for existing computer software, new versions of existing computer software, brand new computer software, new help files, etc. The content may further include information regarding availability of hardware and third party products and services that is of interest to the user. The user is then able to make one or more choices from the summary of available products and services, and request that the products be transferred from the service computer 26 to the user computer. Alternatively, the user may purchase the desired product or service from the summary of available products and services.

Figure 2:
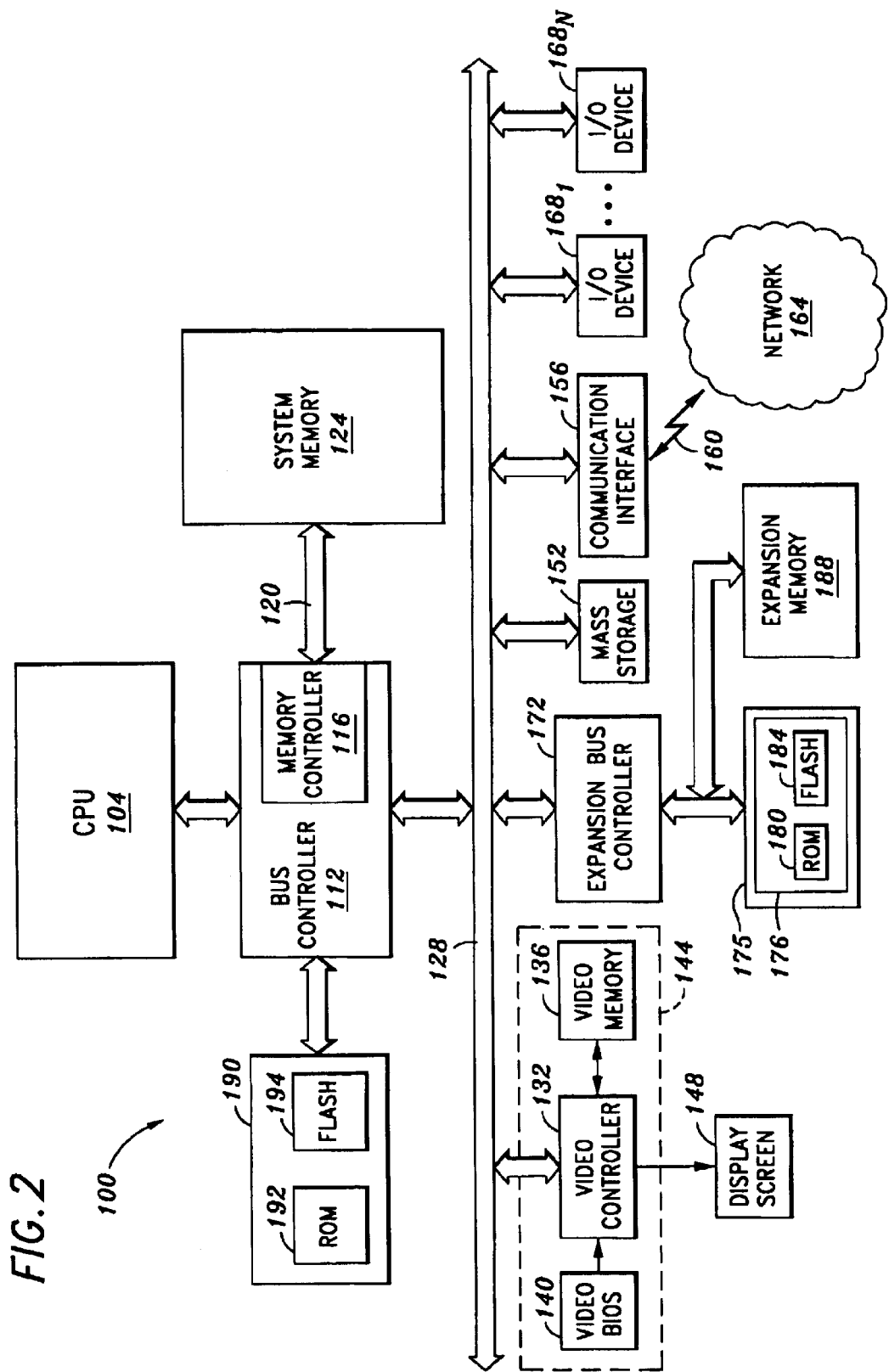
FIG. 2 illustrates an exemplary processor system or user computer system, which implements embodiments of the present invention.

FIG. 2 illustrates an exemplary computer system 100 that implements embodiments of the present invention. The computer system 100 illustrates one embodiment of user computer systems $40_1$–$40_N$ and/or computers $26_1$–$26_M$ (FIG. 1), although other embodiments may be readily used.

Referring to FIG. 2, the computer system 100 comprises a processor or a central processing unit (CPU) 104. The illustrated CPU 104 includes an Arithmetic Logic Unit (ALU) for performing computations, a collection of registers for temporary storage of data and instructions, and a control unit for controlling operation for the system 100. In one embodiment, the CPU 104 includes any one of the x86, Pentium, Pentium II, and Pentium Pro microprocessors as marketed by Intel Corporation, the K-6 microprocessor as marketed by AMD, or the 6x86MX microprocessor as marketed by Cyrix Corp. Further examples include the Alpha processor as marketed by Digital Equipment Corporation, the 680X0 processor as marketed by Motorola; or the Power PC processor as marketed by IBM. In addition, any of a variety of other processors, including those from Sun Microsystems, MIPS, IBM, Motorola, NEC, Cyrix, AMD, Nexgen and others may be used for implementing CPU 104. The CPU 104 is not limited to microprocessor but may take on other forms such as microcontrollers, digital signal processors, reduced instruction set computers (RISC), application specific integrated circuits, and the like. Although shown with one CPU 104, computer system 100 may alternatively include multiple processing units.

The CPU 104 is coupled to a bus controller 112 by way of a CPU bus 108. The bus controller 112 includes a memory controller 116 integrated therein, though the memory controller 116 may be external to the bus controller 112. The memory controller 116 provides an interface for access by the CPU 104 or other devices to system memory 124 via memory bus 120. In one embodiment, the system memory 124 includes synchronous dynamic random access memory (SDRAM). System memory 124 may optionally include any additional or alternative high speed memory device or memory circuitry. The bus controller 112 is coupled to a system bus 128 that may be a peripheral component interconnect (PCI) bus, Industry Standard Architecture (ISA) bus, etc. Coupled to the system bus 128 are a graphics controller, a graphics engine or a video controller 132, a mass storage device 152, a communication interface device 156, one or more input/output (I/O) devices $168_1$–$168_N$, and an expansion bus controller 172. The video controller 132 is coupled to a video memory 136 (e.g., 8 Megabytes) and video BIOS 140, all of which may be integrated onto a single card or device, as designated by numeral 144. The video memory 136 is used to contain display data for displaying information on the display screen 148, and the video BIOS 140 includes code and video services for controlling the video controller 132. In another embodiment, the video controller 132 is coupled to the CPU 104 through an Advanced Graphics Port (AGP) bus.

The mass storage device 152 includes (but is not limited to) a hard disk, floppy disk, CD-ROM, DVD-ROM, tape, high density floppy, high capacity removable media, low capacity removable media, solid state memory device, etc., and combinations thereof. The mass storage device 152 may include any other mass storage medium. The communication interface device 156 includes a network card, a modem interface, etc. for accessing network 164 via communications link 160. The I/O devices $168_1$–$168_N$ include a keyboard, mouse, audio/sound card, printer, and the like. The I/O devices $168_1$–$168_N$ may be a disk drive, such as a compact disk drive, a digital disk drive, a tape drive, a zip drive, a jazz drive, a digital video disk (DVD) drive, a solid state memory device, a magneto-optical disk drive, a high density floppy drive, a high capacity removable media drive, a low capacity media device, and/or any combination thereof. The expansion bus controller 172 is coupled to non-volatile memory 175, which includes system firmware 176. The system firmware 176 includes system BIOS 82, which is for controlling, among other things, hardware devices in the computer system 100. The system firmware 176 also includes ROM 180 and flash (or EEPROM) 184. The expansion bus controller 172 is also coupled to expansion memory 188 having RAM, ROM, and/or flash memory (not shown). The system 100 may additionally include a memory module 190 that is coupled to the bus controller 112. In one embodiment, the memory module 190 comprises a ROM 192 and flash (or EEPROM) 194.

As is familiar to those skilled in the art, the computer system 100 further includes an operating system (OS) and at least one application program, which in one embodiment, are loaded into system memory 124 from mass storage device 152 and launched after POST. The OS may include any type of OS including, but not limited or restricted to, DOS, Windows™ (e.g., Windows 95™, Windows 98™, Windows NT™), Unix, Linux, OS/2, OS/9, Xenix, etc. The operating system is a set of one or more programs, which control the computer system's operation, and the allocation of resources. The application program is a set of one or more software programs that perform a task desired by the user.

In accordance with the practices of persons skilled in the art of computer programming, the present invention is described below with reference to symbolic representations of operations that are performed by computer system 100, unless indicated otherwise. Such operations are sometimes referred to as being computer-executed. It will be appreciated that operations that are symbolically represented include the manipulation by CPU 104 of electrical signals representing data bits and the maintenance of data bits at memory locations in system memory 124, as well as other processing of signals. The memory locations where data bits are maintained are physical locations that have particular electrical, magnetic, optical, or organic properties corresponding to the data bits.

When implemented in software, the elements of the present invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

FIG. 3 illustrates a logical diagram of computer system 100. Referring to FIGS. 2 and 3, the system firmware 176 includes software modules and data that are loaded into system memory 124 during POST and subsequently executed by the processor 104. In one embodiment, the system firmware 176 includes a system BIOS module 82 having system BIOS handlers, hardware routines, etc., a ROM application program interface (RAPI) module 84, an initial start-up application (ISUA) module 86, an initial payload 88, cryptographic keys 90, a cryptographic engine 92, and a display engine 94. The aforementioned modules and portions of system firmware 176 may be contained in ROM 180 and/or flash 184. Alternatively, the aforementioned modules and portions of system firmware 176 may be contained in ROM 190 and/or flash 194. The RAPI 84 provides a secure interface between ROM application programs and system BIOS 82. The RAPI 84, ISUA 86, and initial payload 88a may each be separately developed and stored in the system firmware 176 prior to initial use of the computer system 100. In one embodiment, the RAPI 84, ISUA 86, and initial payload 88 each includes proprietary software developed by Phoenix Technologies, Ltd. One embodiment of RAPI 84 is described in co-pending U.S. patent application Ser. No. 09/336,889 entitled "System and Method for Securely Utilizing Basic Input and Output System (BIOS) Services," filed on Jun. 18, 1999, assigned to Phoenix Technologies, Ltd., and which is incorporated herein by reference. One embodiment of ISUA 86 is described in co-pending U.S. patent application Ser. No. 09/336,289 entitled "Method and Apparatus for Automatically Installing and Configuring Software on a Computer," filed on Jun. 18, 1999, assigned to Phoenix Technologies, Ltd., and which is incorporated herein by reference.

Figure 4A:
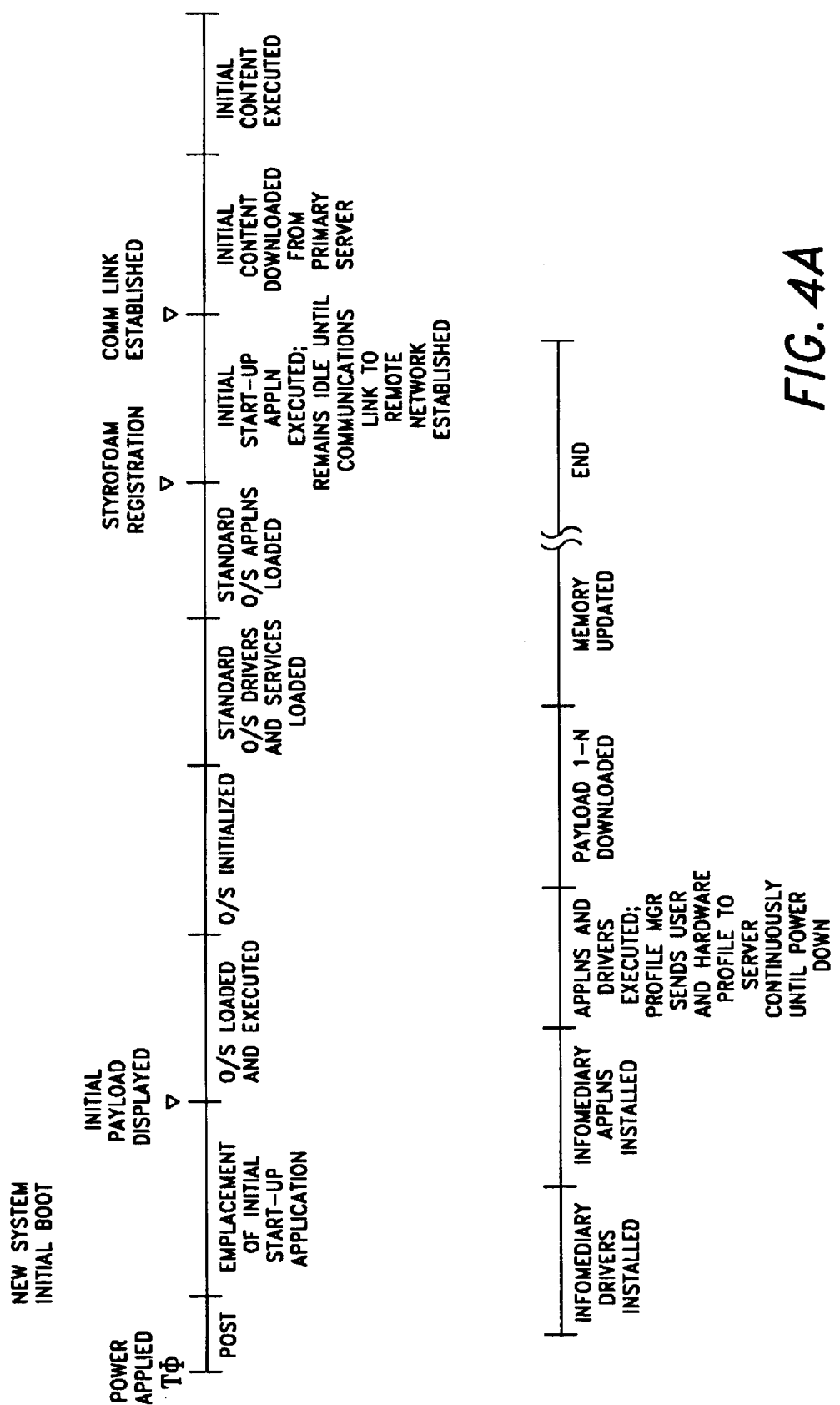
FIG. 4A and FIG. 4B illustrates one embodiment of a process flow chart provided in accordance with the principles of the invention.
Figure 4B:
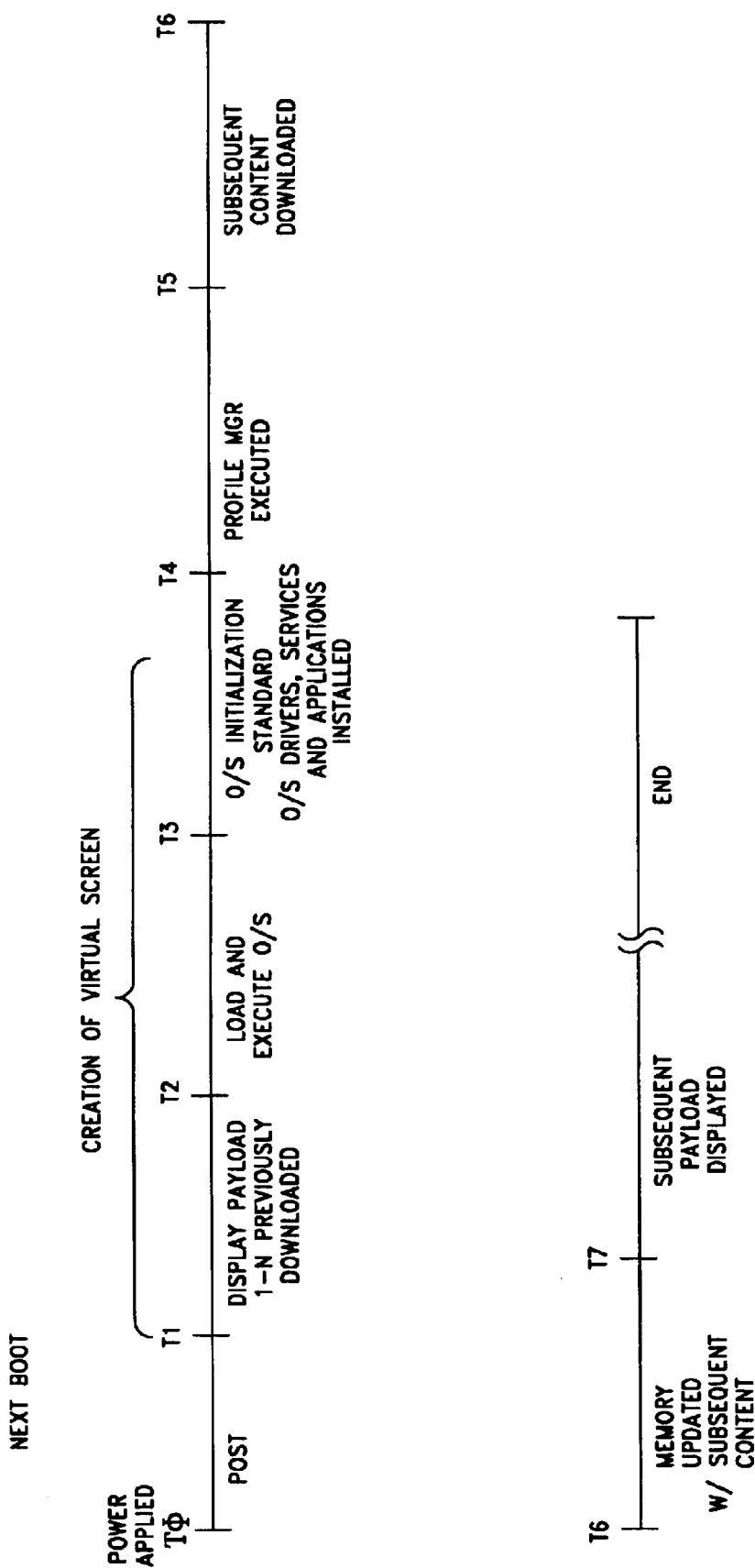

In one embodiment, as shown in FIGS. 3 and 4A and 4B, after power is initially turned on to a new computer system 100, the system commences with POST procedures. During the initial POST, the ISUA 86 is transferred to the mass storage device 152, as shown by A1. In one embodiment, such a transfer is made during the manufacturing and/or assembly process, when the system 100 is first powered up after the operating system has been installed (but prior to loading and running the operating system). In an alternative embodiment, such a transfer may be made after the manufacturing and/or assembly process, after the user receives and powers up the system 100. In a further alternate embodiment, during the transfer of the ISUA 86, additional programs, applications, drivers, data, graphics and other information may also be transferred (for example, from ROM) to the mass storage device 152. For example, the transfer may include the transfer of the initial payload 88a to the mass storage device 152, subsequent to which the initial payload is delivered from the mass storage device 152. Alternatively, the initial payload may be delivered from the ROM. One embodiment of the system and process for facilitating such a transfer is described in co-pending U.S. patent application Ser. No. 09/336,067 entitled "Method and System for Transferring an Application Program from System Firmware to a Storage Device" filed on Jun. 18, 1999, which is assigned to Phoenix Technologies, Ltd., the contents of which are incorporated herein by reference. Alternative embodiments of the system and process for facilitating such a transfer are described in co-pending U.S. patent application Ser. No. 09/272,859, entitled "Method and Apparatus for Providing Memory-based Device Emulation" filed on Mar. 19, 1999, in co-pending U.S. patent continuation-in-part application Ser. No. 09/336,307 entitled "Method and Apparatus for Providing Memory-Based Device Emulation" filed on Jun. 18, 1999, and in co-pending U.S. patent application Ser. No. 09/336,281 entitled "System and Method for Inserting One or More Files Onto Mass Storage" filed Jun. 18, 1999, each of which is assigned to Phoenix Technologies, Ltd., the assignee of the present invention, the contents of each of which are incorporated herein by reference.

In one embodiment, the ISUA 86 is a computer software executable program that will determine if there are preinstalled programs that are resident on the end user's system. If so, it will identify those preinstalled programs and create shortcuts (on the desktop in the case of a Windows operating system), or bookmarks, to allow the user to automatically launch the programs. In this embodiment, the executable program is also capable of initiating and establishing two-way communications with one or more applications on the server 22 and/or any one of the service computers 26 (FIG. 1), as described below. Moreover, in one embodiment, graphical content of the initial payload 88a is displayed by display engine 94 on the user's display screen 148 during POST. Alternatively, the graphical content of the initial payload 88a may be displayed after a subsequent booting process. For example, as part of the user's profile as described below, the user may be asked if he or she would like to obtain additional information regarding one or more products and/or services. If the user so desires, content regarding the desired products and/or services will be displayed during subsequent boot processes.

Once POST is completed, the OS is loaded, executed, and initialized. Standard OS drivers and services are then loaded. The user is then prompted to enter registration information including demographic information such as age, gender, hobbies, etc. In addition, the ISUA 86 is executed, and runs in the background, remaining idle until it detects a communication link established between the computer system 100 and a remote server (e.g., server 22 of FIG. 1) over Network 164 of FIG. 2 (e.g., over the Internet). In one embodiment, the ISUA 86 may search through the operating system to determine if there are applications that have been pre-loaded and pre-installed onto the system. If so, the ISUA 86 may automatically provide short cuts and/or bookmarks for the applications to launch into a predetermined server once the communication link is established. This communication link can be established with a network protocol stack, (e.g. TCP/IP) through sockets, or any other two-way communications technique known in the art. Once the communication link 30 is established, the ISUA 86 issues a request signal to the server 22 (as shown by A2) to download an initial content package 62 from a content module 60. Responsive to the request, the server downloads the initial content package 62 (as shown by A3), which, in one embodiment, is stored in the mass storage device 152. In one embodiment, the initial content 62 and subsequent content 64 may be developed separately, and each is encrypted and/or digitally signed using encryption keys, prior to storing of the initial content 62 and subsequent content 64 on the server 22. When the initial content 62 and/or subsequent content 64 is/are subsequently downloaded into system 100, the crypto engine 92 will use keys 90 to decrypt the initial content 62 and/or subsequent content 64.

As discussed earlier, the initial content package 62 may include applications 62a, drivers 62b, and payloads 62c. In one embodiment, the applications 62a include a data loader application and a profile manager application. The data loader application functions in the same or a similar manner as ISUA 86, and once downloaded, disables and replaces the ISUA 86. More specifically, the data loader application is a computer software program which is also capable of initiating, establishing, and terminating two-way communications between the server 22 and the computer system 100. The data loader application also provides traffic control management between the server 22 and computer system 100, as well as other functions to facilitate communication between the end user's system and the designated server, and content downloading to the end user's system.

The profile manager obtains the user and system profiles of the computer system 100 based on user preferences, system hardware, and software installed at the computer system 100. Upon obtaining the user and system profile of the computer system 100, the profile manager application forwards the results to the data loader application, which subsequently provides the information to the server 22, which matches the user indicted preferences with database 24 (FIG. 1). The results may be forwarded at predetermined intervals or at the user's request. The server 22 then processes the user profile or demographic data and targets content to the users which have similar profiles. In addition, the user profile data of a plurality of users are compiled on the server 22 and aggregated to create an aggregate user profile model. Content is then transmitted to user computer system's based on the user profile data and/or the aggregate user profile model (as shown by A4). The subsequent content 64 is downloaded and stored in system firmware 176, designated by numeral 88b. In one embodiment, the subsequent content 64 is stored in non-volatile memory such as flash or EEPROM, with the loading of the subsequent content being done by reflashing the ROM, as is well known by those skilled in the art. The subsequent content 64 may also be stored as one or more files on mass storage device 152 or may be used to modify the Windows™ system file (under the Windows™ environment). The profile collection process is continued as long as the computer system 100 is activated. In one embodiment, content may be downloaded after the user's profile is received and analyzed at the server 22.

When the computer system 100 is subsequently powered up (see FIG. 4B), the system again performs POST. The content that was previously downloaded and stored in system firmware 176, and subject to copyright issues being resolved, is then displayed, prior to loading and/or execution of the operating system. In the Windows™ environment, the Windows™ logo, which is displayed during the initial loading of the operating system, is subsequently replaced by one or more screen that display the previously downloaded content stored in system firmware 176.

In the case of storing the content as one or more files on the mass storage device 152, as opposed to reflashing the ROM, the Windows™ logo file, which is displayed during boot-up and shutdown, may be altered or replaced. One embodiment utilizing this approach involves replacing the corresponding Windows™ system files with the one or more files showing the content (e.g., a graphic file), as described in co-pending U.S. patent application Ser. No. 09/336,003 entitled "Displaying Images during Boot-up and Shutdown" filed on Jun. 18, 1999, which is assigned to Phoenix Technologies, LTD., the contents of which are incorporated herein by reference. The boot-up Windows display file is named LOGO.SYS and is usually located in the Windows directory. First the Windows™ LOGO.SYS file is transferred from the Windows directory to another directory. Then, the content graphics file is renamed as LOGO.SYS and is transferred to the Windows™ directory. The operating system retrieves this file when the operating system is first launched, and hence the content is displayed on the display screen. Windows™ expects the LOGO.SYS file to be a bit-mapped file with resolution 320×400 and 256 colors although Windows™ will later stretch the resolution to 640×400 for displaying purposes. Therefore, the content graphics file is to be the same graphics format (usually named with the extension ".BMP" before being renamed to LOGO.SYS).

The operating system is then loaded, executed, and initialized. The standard operating system drivers and applications are also loaded. The profile manager is then executed. When a link has been established with the predetermined web site, additional content may be downloaded and subsequently displayed. Such additional content are either provided arbitrarily or provided based on the information obtained from a survey of the user or the user's system. In one embodiment, once the boot process is completed, a portion of the display screen may be used to provide icons or shortcuts that are used to access detailed information regarding the previously displayed messages or advertisements. In a further embodiment, the messages or advertisements may again be displayed during the shut-down process, for example, replacing the screen display that displays the message "Windows is shutting down" or "It is now safe to turn off your computer" with other selected content.

Detailed Description

Figure 5:
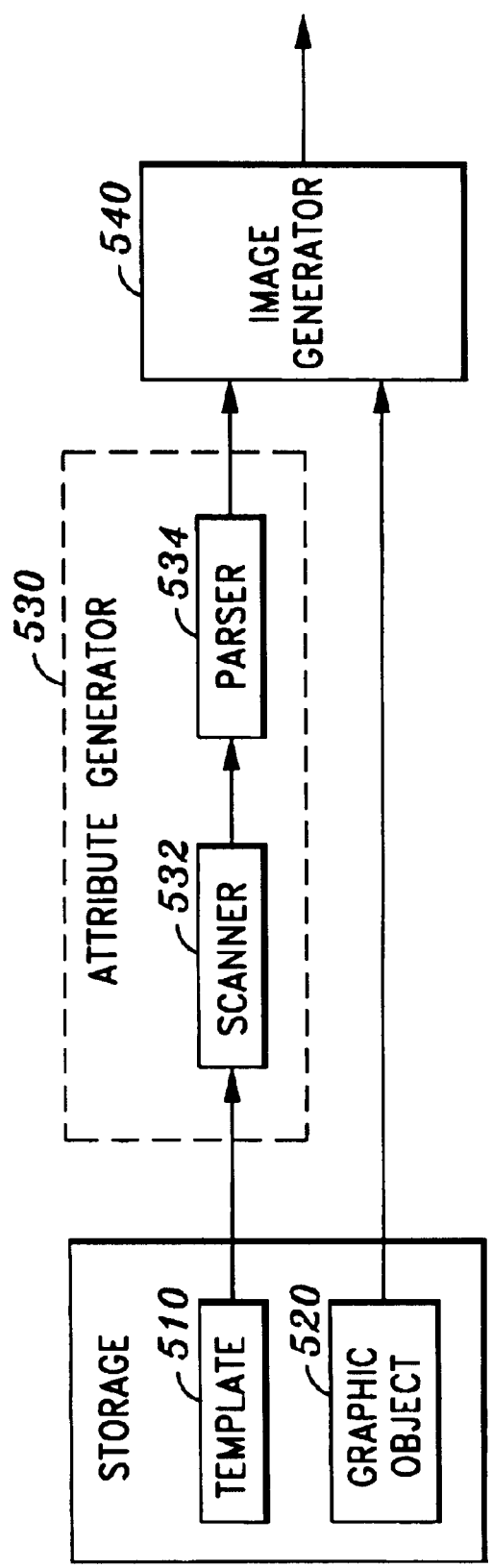
FIG. 5 is a diagram illustrating an architecture to generate an image for display according to one embodiment of the invention.

FIG. 5 is a diagram illustrating an architecture to generate an image for display according to one embodiment of the invention. The architecture includes a storage 124/176/190, an attribute generator 530, and an image generator 540.

The storage 124/176/190 includes a template 510 and graphic objects 520. The storage 124/176/190 may be any storage medium such as random access memory (RAM), read only memory (ROM), erasable ROM (EROM), flash memory. In one preferred embodiment, the storage is a flash memory. The graphic objects 520 may be stored on the same physical storage medium as the template 510 or on another storage medium. For example, both the template 510 and the graphic object 520 may be stored on a firmware such as a flash memory, or the template 510 may be stored on the firmware while the graphic objects 520 are stored on a mass storage device (e.g., hard disk). The template 510 and the graphic objects 520 can be updated.

The template 510 contains a number of identifiers which form graphic attributes that characterizes the graphic objects. The graphic objects 520 contains information about the object to be displayed on the display screen. The graphic objects 520 may include data structures that store image primitives such as line and curve segments that can be manipulated to produce an image. The graphic objects 520 may also contain or reference the raw image data at the bit-mapped level.

The attribute generator 530 includes a scanner 532 and a parser 534. The scanner 532 performs a lexicographic analysis on the template to produce tokens. The parser 534 generates a graphic attribute from a sequence of tokens. The graphic attribute includes a number of identifiers and/or graphic primitives to be operated on the graphic object to generate an image to be displayed on the display screen.

FIG. 6A is a diagram illustrating a template 510 for the graphic object according to one embodiment of the present invention. The template 510 includes a begin code 610, N commands CMD1, CMD2, . . . , CMDN $620_1$, . . . , $620_N$, and an end code 630.

The begin code 610 and the end code 630 are predefined codes to indicate the beginning and the end of the template, respectively. The begin and end codes 610 and 630 are selected such that they are unique codes within the template 510. In one embodiment, the begin and end codes 610 and 630 are one-byte identifiers.

Each of the commands CMDN $620_1$, . . . , $620_N$, includes two parts: a command code 622 and a command information 624. The command code 622 indicates the type of command to be performed and the command information 624 provides the information needed by the command code. Some commands may not need the command information. In one embodiment, the command code 622 is a one-byte identifier and the command information 624 is a multi-byte data.

The command code 622 is an identifier which specifies a graphic operation to be performed by the graphics controller.

A graphic operation may include a display enable/disable, a simple shape drawing (e.g., line, circle, box, triangle, point, polygon), a file referencing (e.g., bitmap, palette, font, animation, sound), and other operations.

Display On 631 indicates that the display is enabled. It does not require a corresponding command information. Display Off 632 indicates that the display is disabled. It does not require a corresponding command information. Line 633 draws a line using line information 634 which includes the coordinates (x1, y1), (x2, y2) of the two end points and the color code of the line. Circle 635 draws a circle using circle information 636 which includes the coordinates (x, y) of the center, the radius, the color, and the fill code. Box 637 draws a rectangle box using box information 638 which includes the four coordinates (x1, y1), (x2, y2), (x3, y3), (x4, y4) of the corner points, the color, and the fill code. Triangle 639 draws a triangle using triangle information 640 which includes the three coordinates (x1, y1), (x2, y2), (x3, y3) of the corner points, the color, and the fill code. Point 641 draws a point using point information 642 which includes the coordinates (x, y) and color of the point. Polygon.643 draws a polygon using polygon information 644 which includes the N coordinates (x1, y1), . . . , (xN, yN) of the corner points, the color, and the fill code.

Bitmap object 651 renders a bitmap object from a bitmap file using bitmap information 652 which specifies a bitmap filename and an extension. Palette object 653 renders a palette object from a palette file using palette information 654 which specifies a palette filename and an extension. Font object 655 renders a font type to text string using font information 656 which specifies a font filename and an extension. Zone object 657 specifies a zone number using the zone information 658 which includes a zone identification. Text string 659 creates a string of text with the specified font type using the text information 660 which includes the string of characters to be generated. Palette index 671 points to the palette object using the palette index information 672 which includes the index. Filled palette index 673 points to the palette used to fill the object using the filled palette index information 674 which includes the index. Animation 675 renders an animation sequence from an animation file using the animation information 676 which includes an animation filename and an extension. Sound 677 generates a sound sequence from a sound file using the sound information 678 which includes a sound filename and an extension.

Figure 6B:
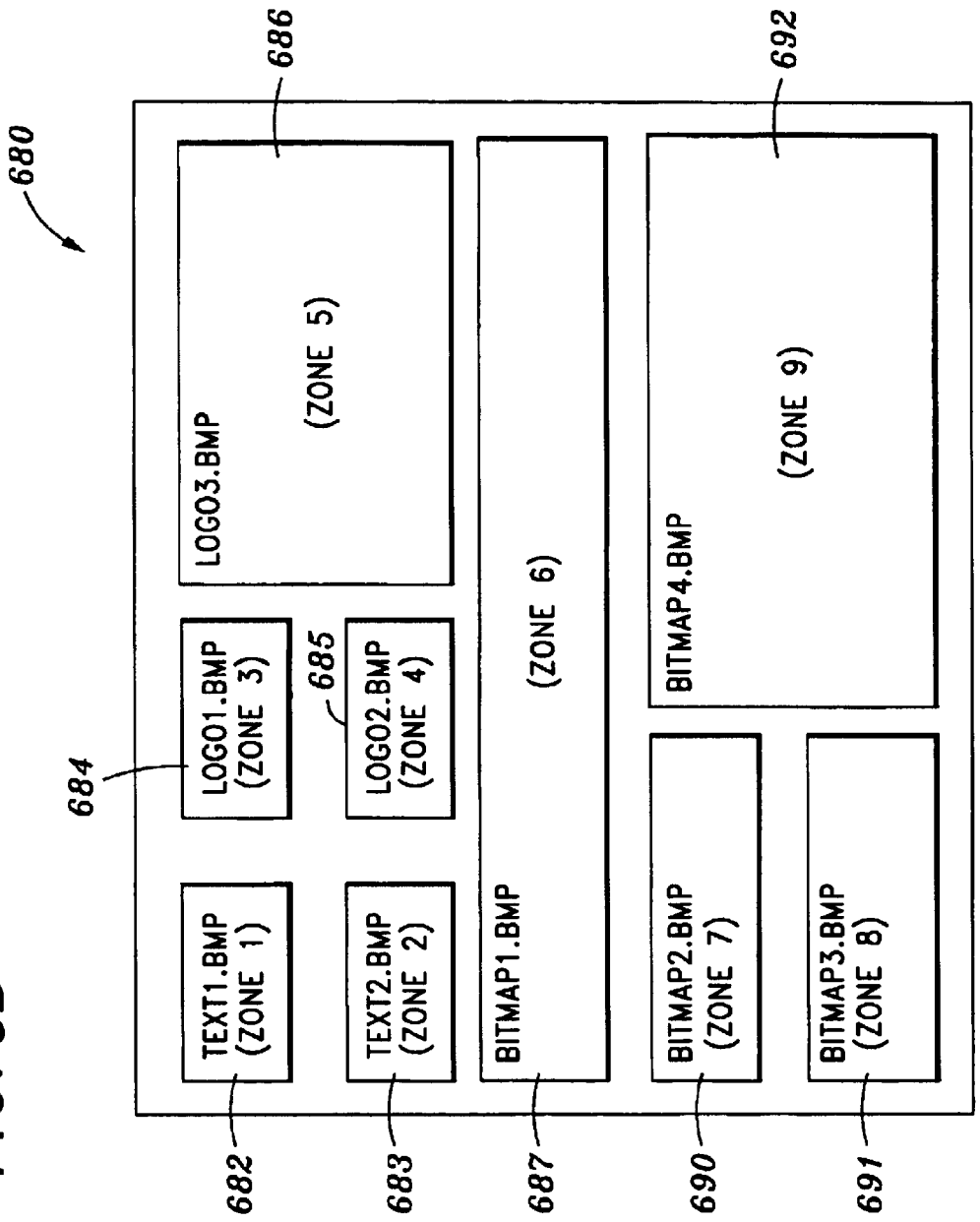
FIG. 6B is a diagram illustrating a display screen according to one embodiment of the invention.

FIG. 6B is a diagram illustrating a display screen 680 according to one embodiment of the present invention. The display screen 680 shows an exemplary display of nine zones which includes a zone 1 682, a zone 2 683, a zone 3 684, a zone 4 685, a zone 5 686, a zone 6 687, a zone 7 690, a zone 8 691, and a zone 9 692.

A template that is used to generate these zones includes a series of commands using the box command which specifies the coordinates of the four corners of each zone. In addition, the corresponding bitmap and text files are referenced to be used for each zone.

The zone 1 682, the zone 2 683, the zone 3 684, the zone 4 685, the zone 5 686, the zone 6 687, the zone 7 690, the zone 8 691, and the zone 9 692 are rendered using the bitmap or text files contained in the referenced files text1.bmp, text2.bmp, logo1.bmp, logo2.bmp, logo3.bmp, bitmap1.bmp, bitmap2.bmp, bitmap3.bmp, and bitmap4.bmp, respectively.

Figure 7:
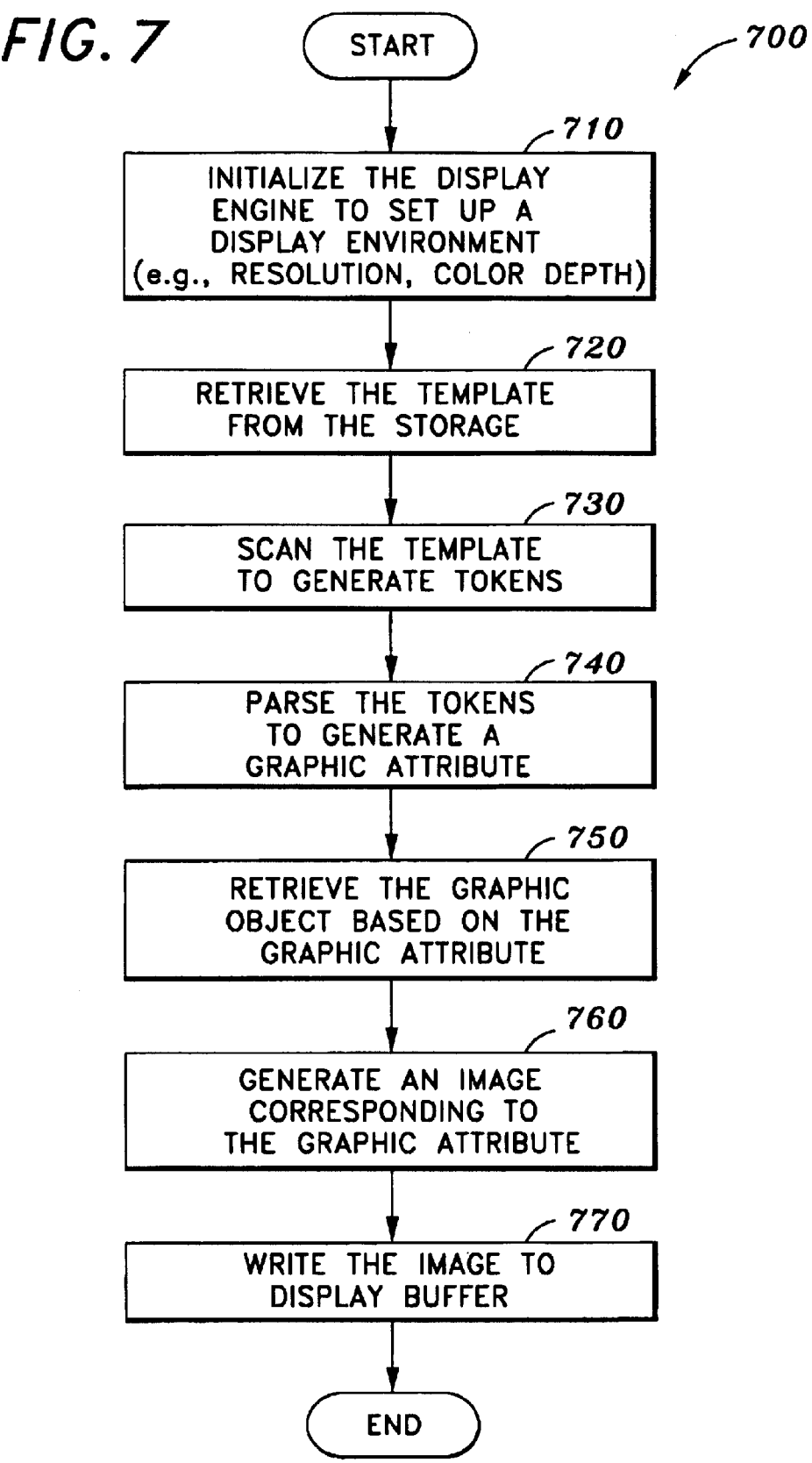
FIG. 7 is a flowchart illustrating a process to display an image according to one embodiment of the invention.

FIG. 7 is a flowchart illustrating a process 700 to display an image according to one embodiment of the invention.

Upon START, the process 700 initializes the display engine to set up a display environment such as display resolution and color depth (Block 710). The display environment may be the default environment of the display engine or may be any specified environment. Then the process 700 retrieves the template from the storage (Block 720). The retrieval may be accomplished by reading the memory location at a predetermined address on the storage. The process 700 scans the template to generate a sequence of tokens (Block 730). Then, the process 700 parses the tokens to generate a graphic attribute characterizing the graphic object (Block 740).

The process 700 retrieves the graphic object from the storage using the location identifier parsed from the template (Block 750). The process 700 then generates the image to be displayed from the graphic object using the graphic attribute (Block 760). Animation and/or sound are produced accordingly if specified in the graphic attribute. The process 700 then writes the image to the display buffer associated with the display engine (Block 760). The process 700 is then terminated.

The booting up of the BIOS and the loading of the operating system by the BIOS may take several seconds. During that time, the monitor screen merely displays BIOS information such as test statistics and results. In most situations, these results are the same and provide no useful information to the user. Therefore, it is preferable to display other graphics such as advertisements, banners downloaded from the internet, or to generate sound during this time. These activities can be performed in the pre-boot period at the early stage of the BIOS booting-up sequence. A media device is a device that can generate graphics or sound, or other media information. For example, a graphics engine or a graphics controller typically has a set of primitives that allows it to display large complex images based on a small amount of data. The resultant display remains on the screen until the BIOS boot-up is completed or when the machine has started to do something else.

Figure 8:
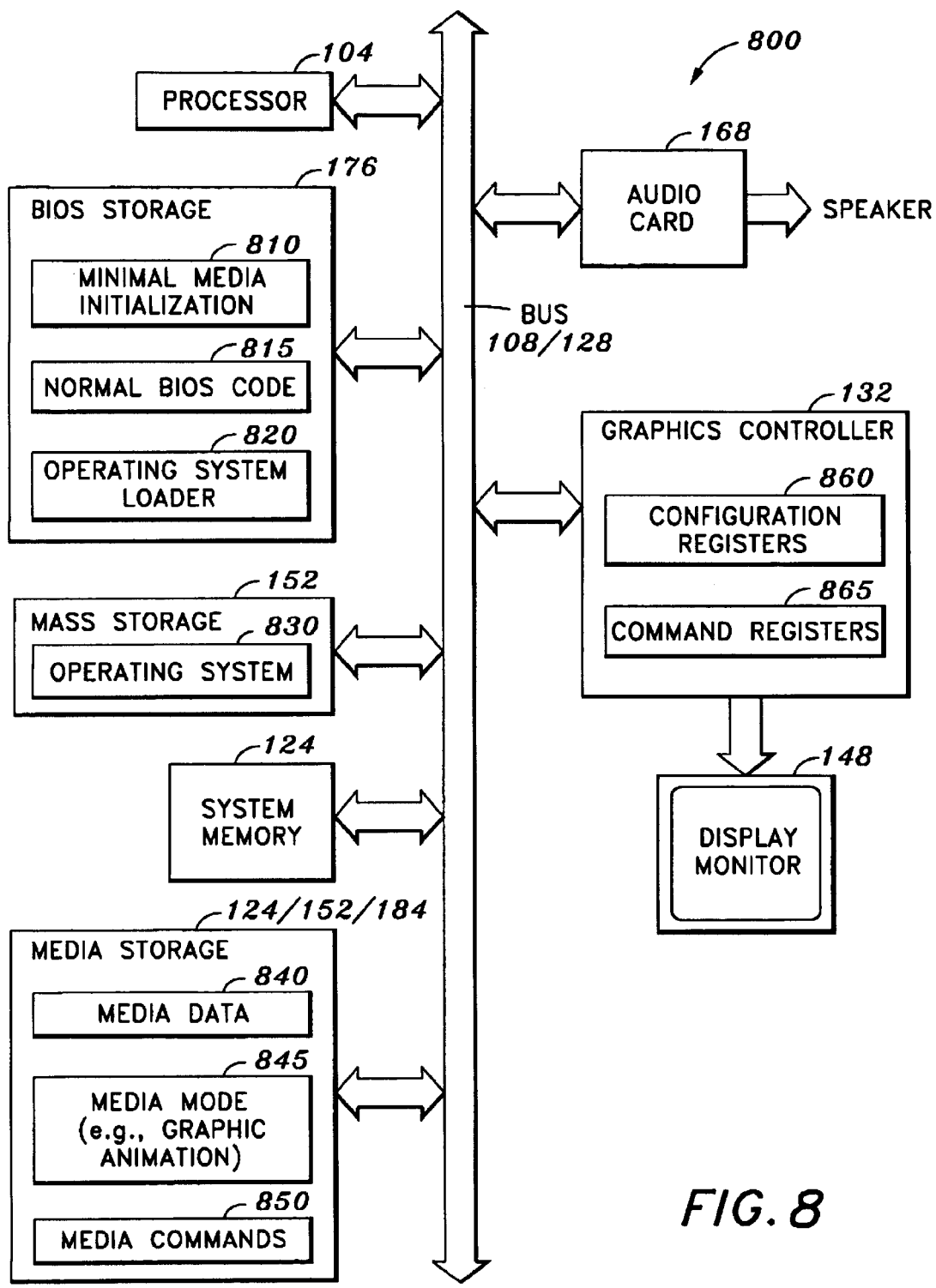
FIG. 8 illustrates one embodiment of the information display screen in accordance with the principles of the invention.

FIG. 8 is a diagram illustrating a pre-boot media system 800 according to one embodiment of the invention. The pre-boot media system 800 essentially is a subset of the system 100 as shown in FIG. 2. The pre-boot media system 800 includes the processor 104, the bus 108/128, the BIOS storage 176, the mass storage 152, a system memory 124, the media storage 124/152/184, an audio card 168, the graphics or video controller 132, and the display monitor 148.

The processor 104 executes instructions in the BIOS storage 176 and the operating system when loaded into the system memory 124. In the pre-boot activities, the processor communicates with the audio card 168 and the graphics controller 132 via the bus 108/128. Upon power on reset, the processor 104 begins to fetch instructions starting from a predefined address to begin booting the BIOS from the BIOS storage 176.

The BIOS storage 176 contains the BIOS which includes a minimal media initialization code 810, a normal BIOS code 815, and an operating system (OS) loader 820. Typically, the processor 104 executes the minimal media initialization code 810 first, then the normal BIOS code 815, and finally the OS loader 820.

The minimal media initialization code 810 includes minimal code that initializes the graphics controller 132 and/or the audio card 168 so that a pre-boot media generation can be performed. The initialization code 810 may include instructions that configure the display mode (e.g., the color depth and the display resolution) of the graphics controller 132, the audio mode of the audio card 168, graphic and/or audio commands, addresses of graphics data and/or sound data. For more advanced graphics controllers, the initialization code 810 may include a complete code sequence that allows the graphics controller to generate images without or with very little additional graphic information. For these graphics controllers, the initialization code 810 may include commands to generate graphic primitives such as pixels, lines, simple shapes, shading, colors, and the specific location on the display screen to display the resulting image. The minimal media initialization code 810 is typically performed at the early stage of the BIOS boot-up so that the pre-boot media generation can start as soon as possible. After the processor 104 executes the minimal media initialization code 810, the graphics controller 132 and/or the audio card 168 begin to function independently of the processor 104.

The normal BIOS code 815 includes instructions to perform normal BIOS tasks during a normal BIOS boot-up. These tasks include POST, initialization and configuration of peripheral devices (including the graphics controller 132 and the audio card 168 if necessary), and other system tests. During this time, the graphics controller 132 continues to generate images to be displayed on the display monitor 132. The audio card 168 also continues to generate sound.

The OS loader 820 includes instructions to load the OS 830 from the mass storage 152 to the system memory 124. As soon as the OS is loaded into the system memory 124, control is passed to the OS and the processor 104 executes the appropriate program from the OS. During the loading time of the OS, the graphics controller 132 and the audio card 168 continue to generate graphics and sound. Since the loading time of the OS may take several seconds to complete, this time is used productively to display useful information on the monitor and/or to generate useful sound. When the OS takes over, the graphics and the sound activities may be performed as required in the appropriate driver of the OS. The pre-boot media activities may be terminated and the normal system operations may begin.

The mass storage 152 stores the OS 830 and other data and information. The OS 830 is loaded into the system memory 124 at the end of the BIOS boot-up as described above. Normally, only a portion of the OS 830 is resident in the system memory 124. Drivers or programs, and/or data may be swapped in and out between the system memory 124 and the mass storage 152 as necessary. The OS 830 may include drivers that re-start the graphics controller 132 and the audio card 168 as appropriate. Normally, when the OS 830 begins execution, the pre-boot media activities are terminated.

The system memory 124 includes random access memory (RAM) that contains the loaded portions of the OS 830. The system memory 124 may also include other types of memory such as flash memory.

The media storage 124/152/184 stores the media information to be used by the media devices if necessary. The media storage 124/152/184 may be part of the system memory 124, the mass storage 152, or the flash memory 184. The media information includes media data 840, media mode 845, and media commands 850. The media data 840 are the data to be used by the media device directly for generating the media output. The data may be accessed directly on the media storage 124/152/184, or is referenced by a pointer or file name. Examples of the media data include graphic bitmapped data and sequence of digitized audio samples. The media mode 845 provides the mode of operation of the media device. For example, a graphic animation mode refer to a series of repetitive sequence of graphics frames. The media commands 850 are the specific commands to be used by the media device to carry out its function. Example of the media commands 850 include a command to put an image of the graphic data to a specified location on the screen, or a command to render the image in a certain way.

The audio card 168 generates sound to a speaker using the sound data in the media data 840. The graphics controller 132 generates images to be displayed on the display monitor 148. The graphics controller 132 includes configuration registers 860 and command registers 865. The configuration registers 860 are used to configure the graphics controller 132 to operate under specified mode. The command registers 865 contain commands to specify the specific operation such as block filling, line drawing, etc. The processor 104 initializes the audio card 168 and the graphics controller 132 by writing configuration data and commands to the corresponding media devices. As soon as the media device is initialized, it can begin to operate on its own. The audio card 168 can retrieve the audio data from the media storage 124/152/184 to produce sound to the speaker. The graphics controller 132 can retrieve the graphic data from the media storage 124/152/184 and generate images on the display screen. Additional commands can be obtained from the media commands 850 to produce further media results.

FIG. 9 is a flowchart illustrating a process 900 for media pre-booting according to one embodiment of the invention.

Upon START, the system starts the power on reset sequence (Block 910). The processor then boots up the BIOS by accessing the BIOS storage (Block 920). The processor initializes the media devices (e.g., the graphics controller, the audio card) with minimal configuration as part of the BIOS (Block 930). The minimal configuration provides enough information for the graphics controller and/or the audio card to begin their own operation independently of the processor.

Then the process 900 is split into two parallel paths: the BIOS path corresponds to the BIOS execution and the media path corresponds to the media devices. The media path includes blocks 940, 950 and 960. The BIOS path includes blocks 945, 955, and 965.

In the BIOS path, the processor continues to complete the BIOS boot-up sequence (Block 945). The remaining BIOS tasks may take several seconds to complete. During that time the graphics controller and/or the audio card perform their function as initialized and configured. After the BIOS tasks are completed, the processor loads the operating system from the mass storage to the system memory (Block 955). Typically, only a portion of the OS system is loaded at a time. After the OS is loaded into the system memory, control is passed onto the OS from the BIOS, and the OS begins to take control and may produce graphics and sound other than what was being generated (Block 965). Then the process 900 is terminated.

After being initialized and configured, the media devices obtain media information such as graphics data, sound data, file reference, commands, primitives, etc. (Block 940). Then the media devices proceed to perform their functions (Block 950). The graphics controller retrieves graphic data and use graphic primitives to display images on the display monitor. The graphic data may correspond to the advertisement or banners as stored in the appropriate storage. Animation can also be performed using a sequence of frames. The audio card generates sound by playing the sound data as retrieved from the audio storage.

Then the process 900 determines if the operating system has taken over control of the system (Block 960). If not, the process 900 goes back to block 950 to continue the media operations. Otherwise, the process 900 is terminated.

Another aspect of the invention involves a system and method for measuring system device performance on-the-fly and graphically displaying the results. In one embodiment, the measured information (e.g., device parameter) is associated with a corresponding graphic object and displayed for viewing.

A further aspect of the invention n is a method and apparatus to provide functionalities to system BIOS in a simple, elegant and flexible manner. An interface module is provided, which enables various parties such as PC system manufacturers and motherboard manufacturers to provide additional system BIOS functionalities with minimal impact to the system BIOS code. The method comprises interfacing an inter ace module to the system BIOS, and receiving a request from the system BIOS to perform a task. System device information, such as values representative of device parameters, associated with he task is received from the system BIOS. The interface module translates the system device information to provide translated information. The translated information is then transferred to a corresponding module. It should be noted that the implementation of the interface module may be provided independently of the technique for generating media output, and the technique for measuring system device performance on-the-fly and the graphical display of the result.

Figure 10A:
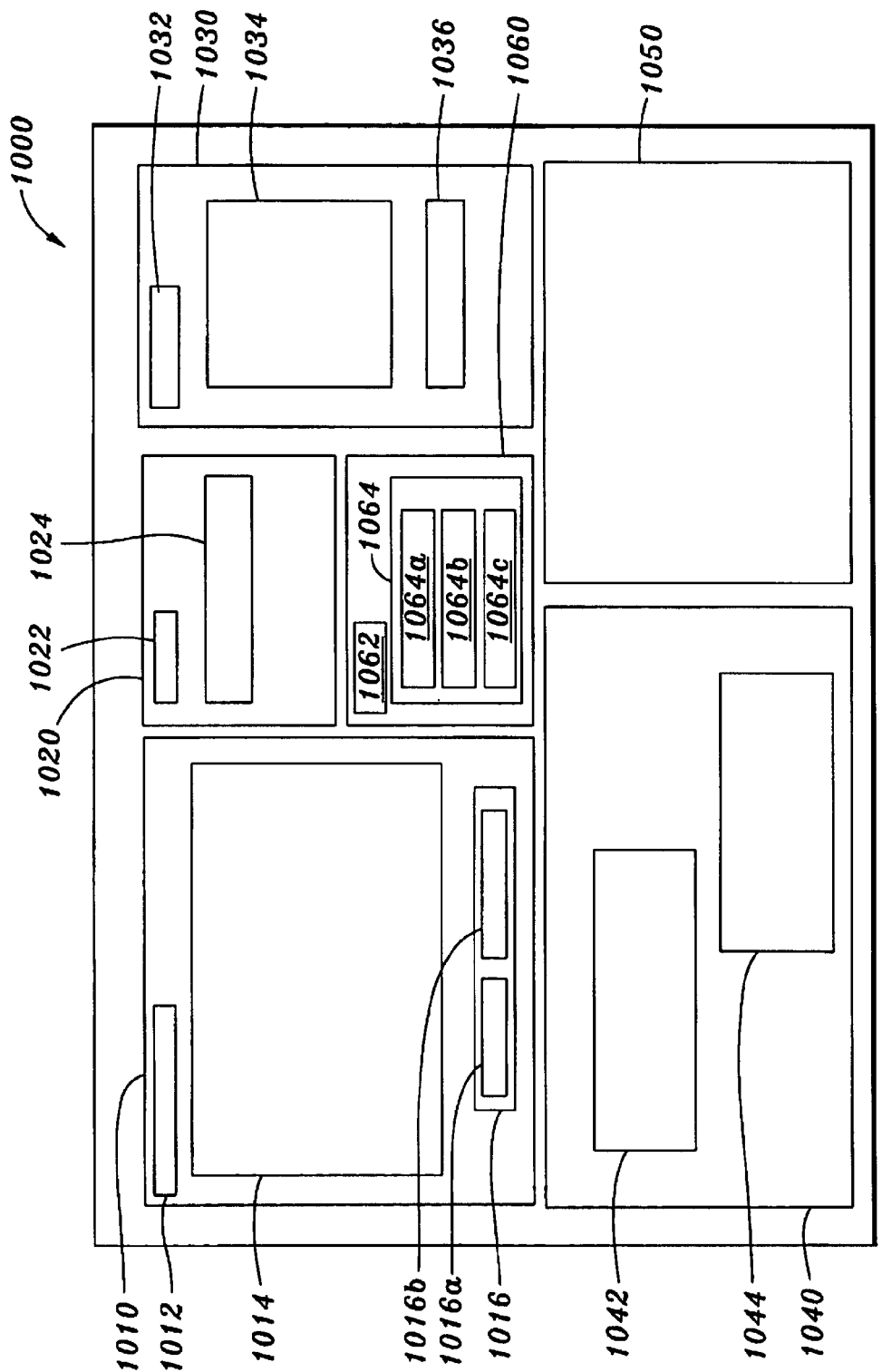
FIG. 10A illustrates one embodiment of the information display screen in accordance with another aspect of the invention.

FIG. 10A illustrates one embodiment of the information display screen 1000 in accordance with the principles of the invention. The display screen 1000 shows an exemplary display of six zones: zone 1 1010, zone 2 1020, zone 3 1030, zone 4 1040, zone 5 1050 and zone 6 1060. Each zone 1010, 1020, 1030, 1040, 1050 and 1060 may further include sub zones. For example, zone 1 1010 includes sub zones 1012, 1014 and 1016, zone 2 1020 includes sub zones 1022 and 1024, zone 3 includes sub zones 1032, 1034 and 1036, zone 4 includes sub zones 1042 and 1044, and zone 6 1060 includes sub zones 1062 and 1064. Each sub zone may further include one or more fields. For example, sub zone 1016 includes fields 1016a and 1016b, while sub zone 1064 includes fields 1064a, 1064b and 1064c.

As with the embodiment shown in FIG. 6B, a template that is used to generate these zones includes a series of commands using a box command that specifies the coordinates of the four corners of each zone. In addition, the corresponding bitmap and text files are referenced to be used for each zone. For example each zone 1010, 1020, 1030, 1040, 1050 and 1060 may be rendered using a bitmap or text files contained in a corresponding referenced text file, logo file or bitmap file.

Figure 10B:
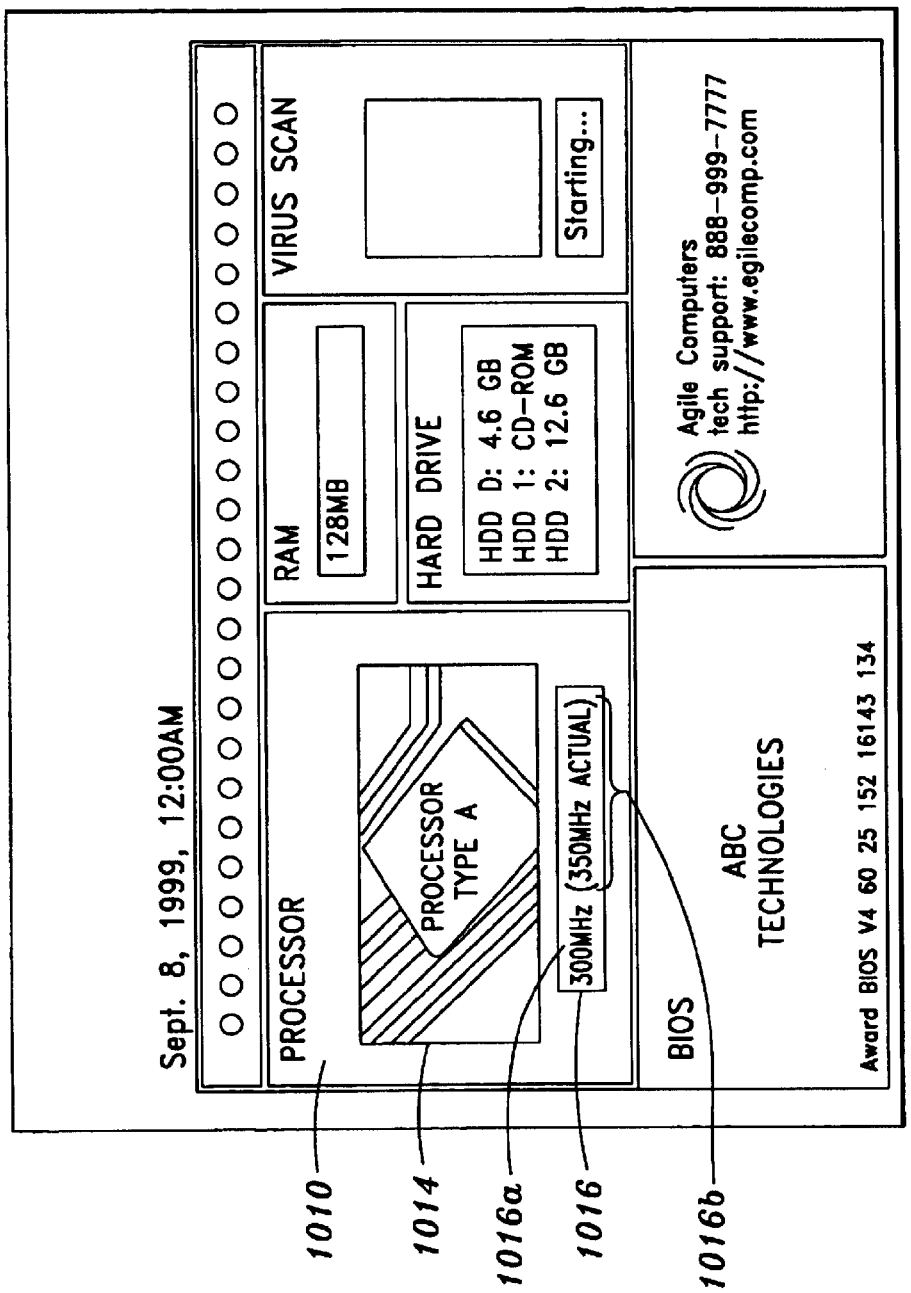
FIG. 10B illustrates a second embodiment of the information display screen in accordance with another aspect of the invention.

In one embodiment, as shown n FIG. 10B, the zones 1010, 1020, and 1060 may be used to display information (e.g., device parameters) regarding system device capacity and/or performance. For example, zone 1 1010 may be use d to display in sub zone 1012, text identifying the system device, which in this case, is "processor." Likewise, zone 2 1020 and zone 6 1060 may be used to display in sub zones 1022 and 1060 respectively, text identifying the corresponding system device "RAM" and "hard drive". In zone 1 1010, a corresponding logo may be displayed in sub zone 1014. In addition, text reflecting two parameters of the system device may be displayed in fields 1016a and 1016b of sub zone 1016. For example, where the system device parameter is processor operating speed, field 1016a may display a processor operating speed determined using a first set of criteria, while field 1016b may display a process operating speed determined using a second set of criteria. The first set of criteria may be determined by a vendor (e.g. company that produces the production system BIOS), while the second set of criteria may be determined by a manufacturer (.e.g. processor manufacturer).

In zone 2 1020, a text file containing the capacity of the system device identified in sub zone 1022 may be displayed in sub zone 1024. Likewise, a list of the hard drives, and their corresponding capacity or type, may be identified in the fields 1064a, 1064b and 1064c. Other functions, logos or images may be similarly displayed in zone 3 1030, zone 4 1040 and zone 5 1050.

Figure 11A:
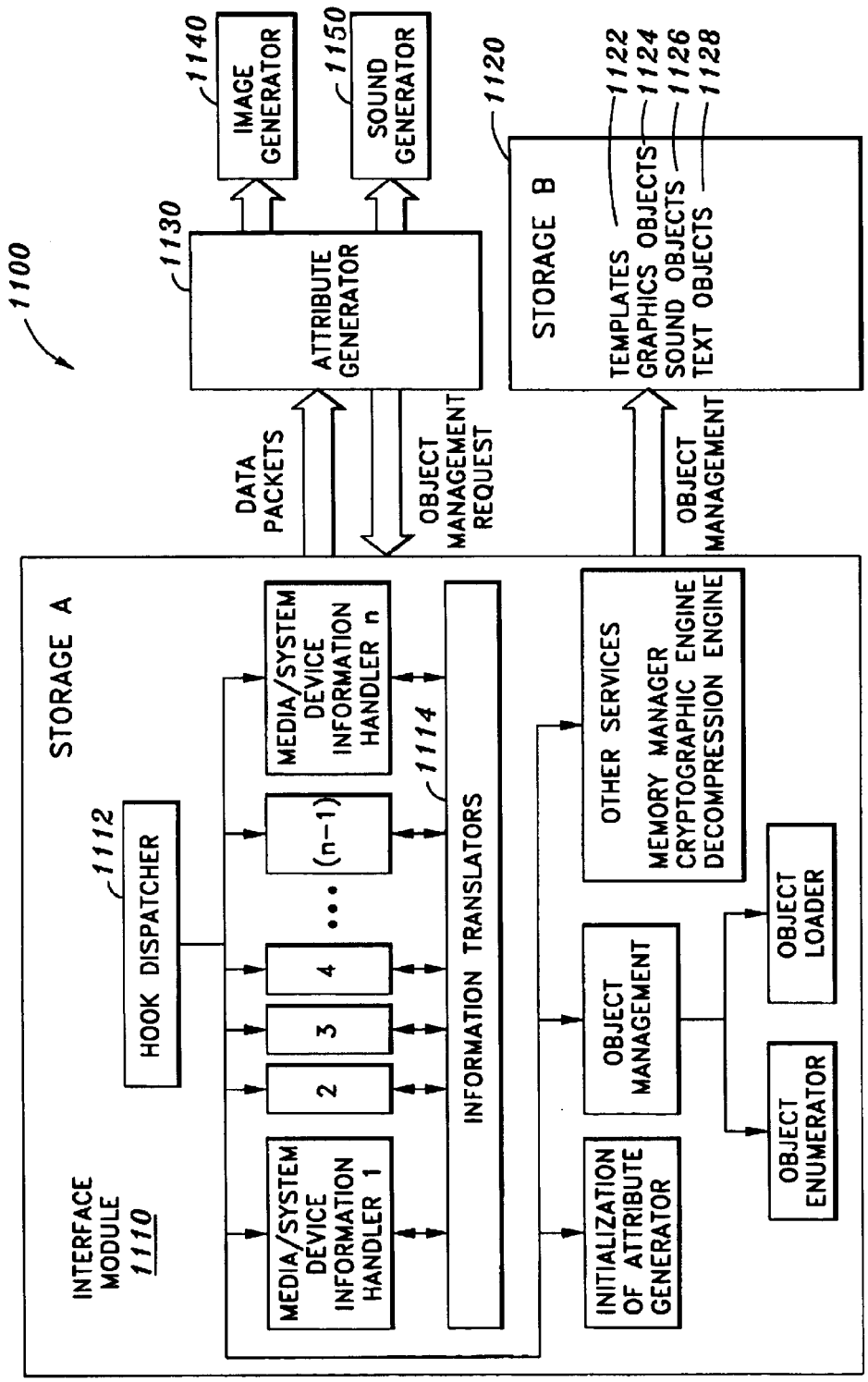
FIG. 11A is a diagram illustrating one embodiment of a system architecture of the software modules implemented in accordance with the principles of the invention.

FIG. 11A is a diagram illustrating one embodiment of a system architecture 1100 of the software modules implemented in accordance with the principles of the invention. The architecture 1100 includes a storage A in which an interface module 1110 is located, and storage B 1120 in which one more templates 1122, one or more graphics objects 1124, one or more sound objects 1126 and one or more text objects 1128 are stored. In one embodiment, storage A and storage B may be implemented as system memory 124, system firmware 176, and/or memory module 190 as shown in FIG. 2. In another embodiment, storage A and storage B may be an integral unit. Alternatively, storage A and storage B may be separate storage units.

The storage 124/176/190 (FIG. 2) may be any storage medium such as random access memory (RAM), read only memory (ROM), erasable ROM (EROM), flash memory. In one preferred embodiment, the storage is a flash memory. The template 1122, graphic object 1124, sound object 1126 and text objects 1128 may be stored on the same physical storage medium or on separate storage medium(s) in any combination. The template, 1122, graphic object 1124, sound object 1126 and text object 1128 can be updated.

The Interface Module 1110 includes a hook dispatcher 1112 that performs a variety of functions. In one embodiment, the hook dispatcher 1112: (i) obtains media and/or system device information (e.g., device parameters) from the BIOS (alternatively, the hook dispatcher 1112 may obtain media and/or system device information from the interface module 1110 itself); (2) initializes the Attribute Generator 1130; (iii) provides object management; and (iv) provides other services including but not limited to memory management, provides encryption/decryption, and decompression.

Examples of the information (e.g., device parameters) obtained from the processor may include the processor operating speed as measured using a first set of criteria and the processor operating speed as measured using a second set of criteria. The first set of criteria may include the operating speed of the processor as measured by the system BIOS on the fly. The first set of criteria may be that measured by code provided, specified or determined by a predetermined party, such as the company that produces th production system BIOS. For example, the first set of criteria may be implemented as code i stalled on the system BIOS. One example of such code includes the AwardBIOS 4.51, the AwardBIOS 6.0 and/or the PhoenixBIOS 4.0 Release 6, each of which is marketed by Phoenix Technologies, Inc., San Jose, Calif. The second set of criteria may include tests/code provided, specified and/or determined by a second predetermined party, e.g., a processor manufacturer.

The measurement of the processor operating speed may be performed by one or more benchmark programs having a set of predetermined sequence of instructions. Real-time timing values can be obtained before and after the benchmark program is executed. The time interval during which the benchmark program is executed can be compared with results from known processor speeds. From this comparison, a relative speed and/or an absolute processor speed, expressed in terms of the processor clock frequency, can be determined.

System device parameter information obtained regarding the memory may include the type and capacity of memory available or installed. In addition, information (e.g., device parameters) regarding the IDE may include device parameters for hard disk drives, CD-ROM drives, LS 120 drives, ZIP drives, DVD drives, etc.

When a task or performance of a system BIOS function (e.g., displaying of a processor graphics image) is required or requested, a request is issued from system BIOS. The request includes media and/or system device information (e.g., device parameters), and is typically provided in the form of a raw number, from system BIOS. The raw number is converted by one of a plurality of Information Translators 1114 to a readable format for the Attribute Generator 1130. In particular, the Information Translator 1114 receives the raw number and translates it to a string which includes the corresponding translated information. For example, if the device parameter requested is the operating speed of a processor, the identification of the processor, such as type (e.g., AMD Athlon, Intel Pentium, Intel Celeron, etc.) of processor, is provided by referring to a processor map table (see FIG. 1) B). This identification includes a keyword, which is translated by the Information Translator into an object name (FIG. 11B). The object name is then provided to the Attribute Generator 1130. Upon receiving the object name, the Attribute Generator 1130 performs a lexicographic analysis on one or more of the templates 1122 by issuing an object management request. The object management request is dispatched to the one or more templates 1122 via Interface Module 1110. The Attribute Generator 1130 also generates a corresponding graphic attribute, each of which includes a number of identifiers and/or graphic primitives to be operated on the graphic object to generate an image to be displayed on the display screen. The resulting image is then displayed in sub-zone 1014, along with the text in fields 1016*a* and 1016*b* of sub-zone 1016.

FIG. 12 is a flowchart illustrating one embodiment of a process 1200 to display information in accordance with the principles of the invention. Beginning from a start state, the process 1200 first conducts a Power On Self Test (POST), as shown in process block 1202. The POST may include a plurality of tasks, such as task 1 through task (M−1). The process 1200 next initializes the Interface Module 1110 (see FIG. 11A) and loads the Interface Module 1110 into system memory. Next, the process detects and initializes the audio device(s) located in the system, as shown in process block 1206. The video engine(s) is then detected and initialized (process block 1208).

Next, the process 1200 issue s a command to the Interface Module 1110 (FIG. 11A) to display background graphics, images and/or text, as shown in process block 1210. The process 1200 then proceeds to detect device parameters, beginning with the processor identification and operating speed (block 1212). In one embodiment, two types of device parameters are provided. The first is an operating speed that is determined on-the-fly. Such an operating speed is determined by software using a predetermined set of criteria and may be provided, specified or determined by a party such as the company that produces the production system BIOS. Examples of such software includes the AwardBIOS 4.51, the AwardBIOS 6.0 and/or the PhoenixBIOS 4.0 Release 6, each of which is marketed by Phoenix Technologies, Inc., San Jose, Calif. The second may be an operating speed determined by the processor manufacturer. In one embodiment, such manufacturer determined operating speed may be a fixed number provided by the manufacturer (obtained by reading a specific processor register), or a number determined by software supplied by the manufacturer. The latter number may be obtained by executing one or more software algorithms provided by the manufacturer. The source code for algorithms may reside in the system BIOS. Alternatively, the source code may be otherwise stored (e.g., provided as firmware or in another storage medium).

Once the processor identification and speed are determined, they are transferred to the Interface Module, as shown in process block 1214. The process 1200 then proceeds to process block 1216 where it determines the size and tests the system memory. The process 1200 then passes the system memory information (e.g., device parameters) to the interface module 1200, as shown in process block 1218.

Next, the process detects device parameters for the system mass storage devices, as shown in process block 1220. This information is passed to the Interface Module (process block 1224). The process 1200 then conducts other POST tasks, such as task M (process block 1226). Upon completion of POST, the process 1200 boots the operating system (process block 1228).

It should be noted that the tasks described in process blocks 1204, 1206, 1208, 1210, 1212, 1214, 1216, 1218, 1226 and 1224 need not be performed in sequence or succession. For example, one of the tasks may be performed after POST task 7, and another may be performed after POST task 20. In one embodiment, the tasks described in process blocks 1204, 1206, 1208, 1210, 1212, 1214, 1216, 1218, 1226 and 1224 may be performed in any predetermined order, in succession or otherwise. In an alternate embodiment, the tasks may be performed in a manner determined by the software developer.

Figure 13:
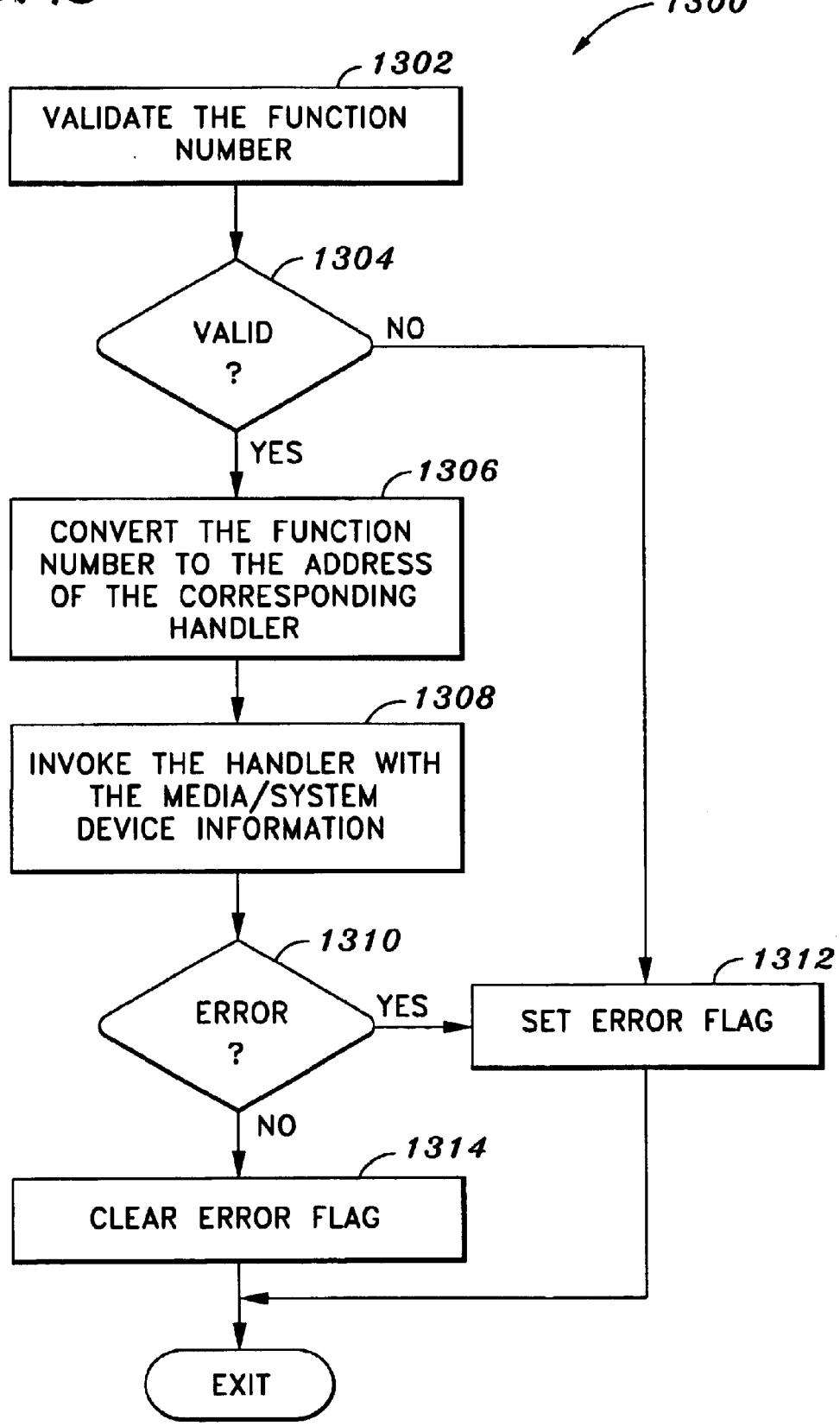
FIG. 13 is a flowchart illustrating one embodiment of a function dispatcher process provided in accordance with the principles of the invention.

FIG. 13 is a flowchart illustrating one embodiment of a function dispatcher process 1300 provided in accordance with the principles of the invention. The process 1300 is performed by the hook dispatcher 1112 of the Interface Module 1110 (FIG. 11A) upon request to perform a corresponding function. The function dispatcher process 1300 may be implemented as (but not limited to) any one of the processes 1210, 1214, 1218 and/or 1224 (FIG. 12). Upon receipt of a request to perform a function, the process 1300 first validates the function number, as shown in process block 1302. If the function number is invalid (as determined in decision block 1304), the process 1300 proceeds to process block 1312, where an error flag is set. The process 1300 then exits. If the function number is determined to be valid, as shown in decision block 1304, the process 1300 converts the function number to the address of the corresponding handler (process block 1306). Next, the handler with the media/system device information is invoked (process block 1308). The process then determines if there is an error (decision block 1310). If not, the error flag is cleared (process block 1314) and the process 1300 exits.

Figure 14:
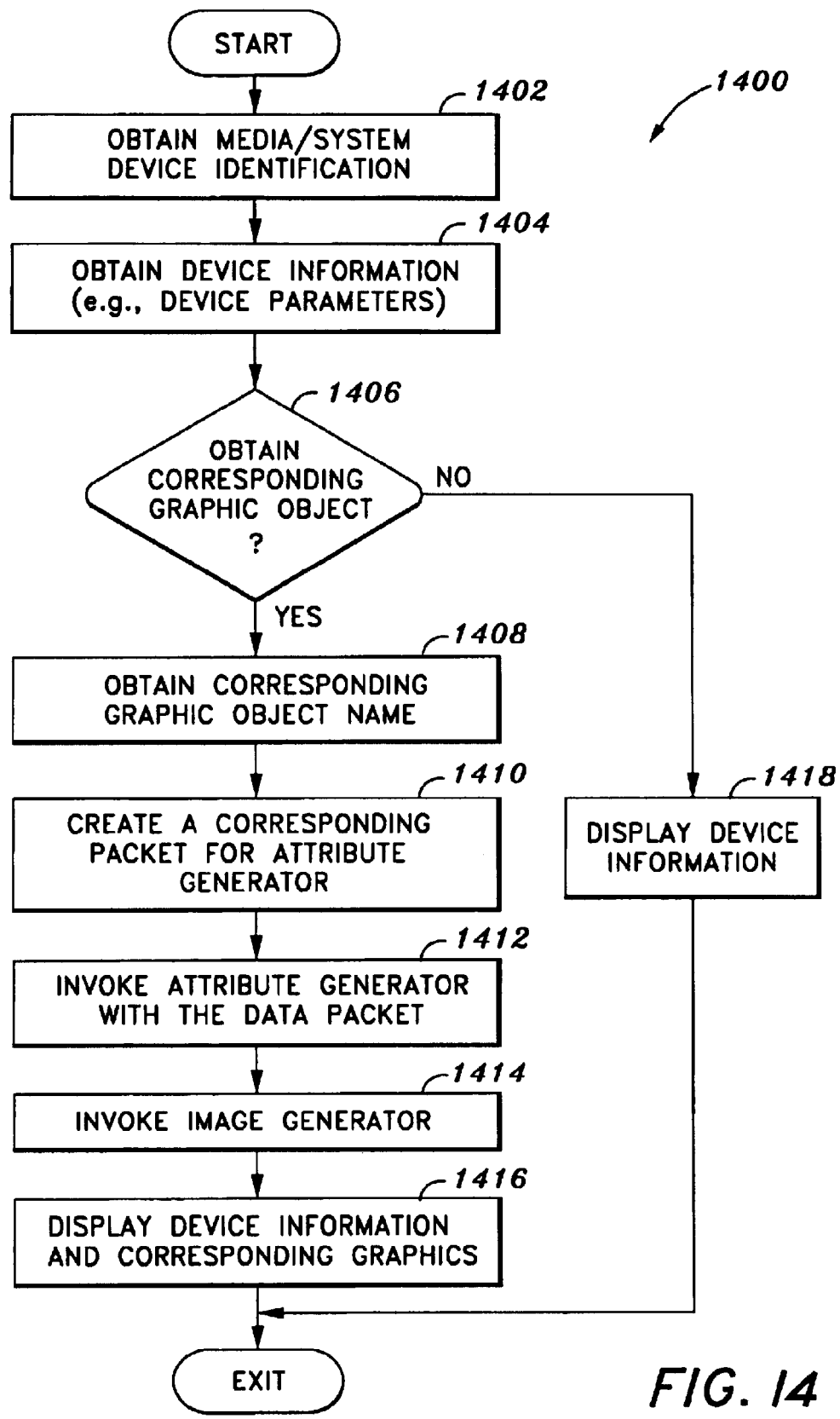
FIG. 14 is a flowchart illustrating one embodiment of an information handler process provided in accordance with the principles of the invention.

FIG. 14 is a flowchart illustrating one embodiment of an information handler process 1400 provided in accordance with the principles of the invention. Beginning from a start state, the process 1400 proceeds to obtain the media/system device identification (process block 1402). The process 1400 then obtains the associated device parameters, such as operating speed in the case of a processor, or memory size in the case of a memory device (block 1404. These device parameters may be determined on-the-fly, as well as by the manufacturer of the device. Next, the process 1400 determines if it should obtain a corresponding graphics object. If not, it proceeds to process block 1418, where it displays the device parameter information, and exits. Otherwise, it obtains the corresponding graphics object name (process block 1408). The process 1400 then advances to process block 1410, where it creates a corresponding data packet for the Attribute Generator. The data packet is then used to invoke the Attribute Generator (process block 1412). Once invoked, the Attribute Generator issues a command to the Image Generator to display the corresponding image (process block 1414). The device information obtained earlier (e.g., the device parameters) is displayed, and the Image Generator displays the corresponding graphics (process block 1416). The process 1400 then exits.

Figure 15:
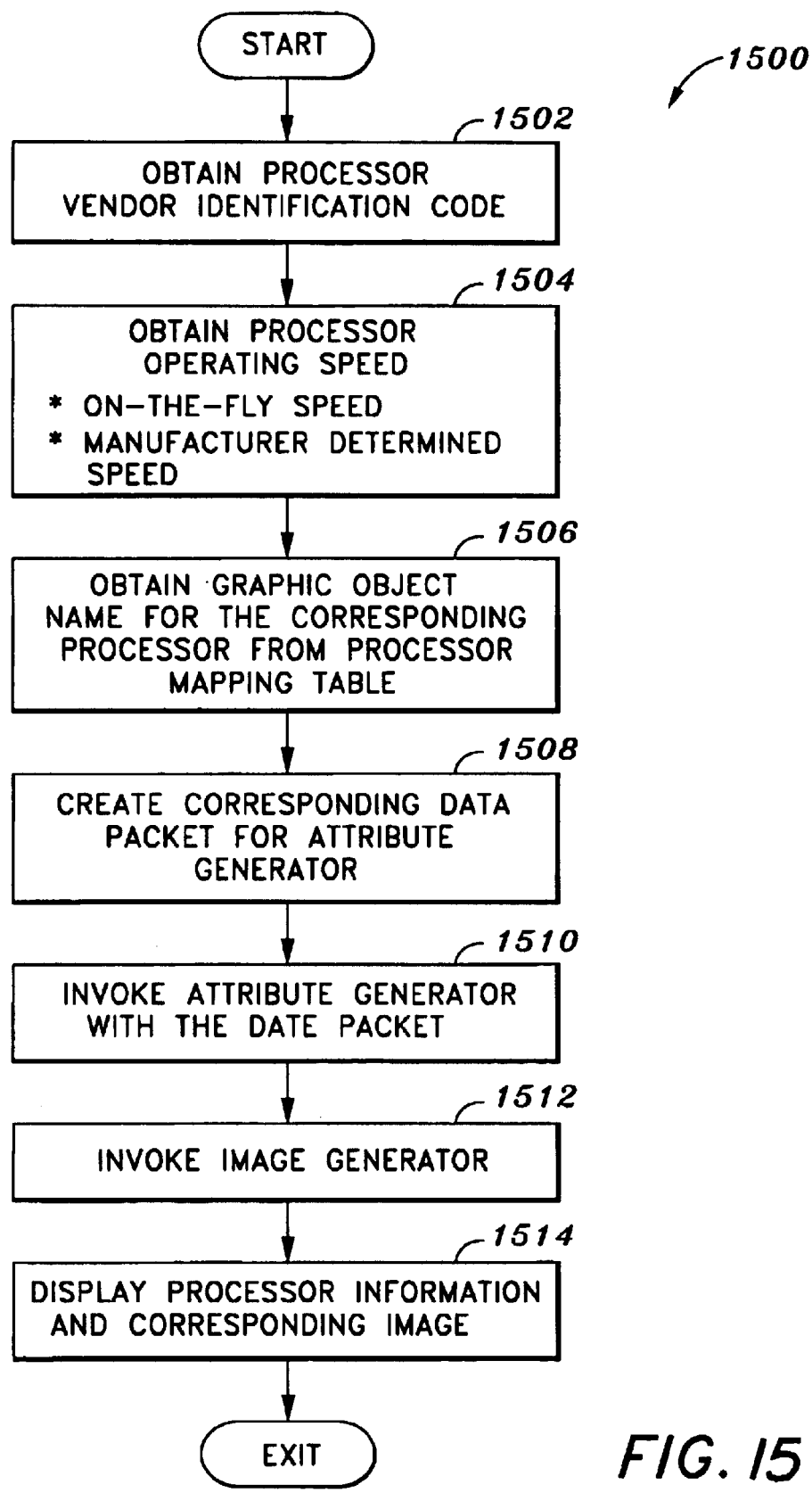
FIG. 15 is a flowchart illustrating one embodiment of a processor information and image handler process provided in accordance with the principles of the invention.

FIG. 15 is a flowchart illustrating one embodiment of a processor information and image handler process 1500 provided in accordance with the principles of the invention. Beginning from a start state, the process 1500 obtains the processor vendor identification code from firmware (process block 1502). Next, the processor operating speed device parameter is obtained (process block 1504). In one embodiment, this includes a value representative of the manufacturer-determined operating speed, and a value representative of the operating speed measured on-the-fly. Next, the graphic object name for the corresponding processor is obtained from a processor mapping table (process block 1506). The process 1500 then creates a corresponding data packet for the Attribute Generator (process block 1508). The Attribute Generator is invoked with the data packet (process block 1510), which in turn invokes the Image Generator (process block 1512). The processor information (both manufacturer determined device parameters and those measured on-the-fly) is displayed, along with the corresponding image. The process 1500 then exits.

Thus, the present invention is an efficient technique to generate a media output. The technique generates a graphic attribute characterizing the graphic object from a template. The image is then generated from the graphic object using the graphic attribute. In another embodiment, a media device such as a graphics controller or an audio card is initialized during the early BIOS boot-up. Then a media operation is performed while the normal BIOS tasks are being performed. The present invention also provides system device information such as values representative of device parameters, that is generated on-the-fly, and also displays such information simply and efficiently.

The present invention also provides an efficient technique to generate a media output. The media output includes system device information (e.g., device parameters) that is generated on-the-fly, and also displays such information simply and efficiently. The technique generates a graphic attribute characterizing the graphic object from a template. The image is then generated from the graphic object using the graphic attribute. In another embodiment, a media device such as a graphics controller or an audio card is initialized during the early BIOS boot-up. Then a media operation is performed while the normal BIOS tasks are being performed.

The present invention also provides a method and apparatus to provide functionalities to system BIOS in a simple, elegant and flexible manner. An interface module is provided, which enables various parties such as PC i system manufacturers and motherboard manufacturers to provide additional system BIOS functionalities with minimal impact to the system BIOS code. The method comprises interfacing an interface module to the system BIOS, and receiving a request. from the system BIOS to perform a task. System device information such as values representative of device parameters, associated with the task is received from the system BIOS. The interface module translates the system device information to provide translated information. The translated information is then transferred to a corresponding module.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method to display information comprising:
   retrieving, during a boot period, a first value representative of a first device parameter;
   detecting, during the boot period, a second value representative of a second device parameter;
   retrieving a template corresponding to a graphic object from a storage, said template including a plurality of commands;
   generating a graphic attribute based on one or more of said commands from the template, the graphic attribute characterizing the graphic object;
   displaying said first and second values; and
   generating an image, during a boot period of the computer system, from the graphic object according to the graphic attribute.

2. The method of claim 1, wherein the first device parameter is a parameter determined at the time of manufacture.

3. The method of claim 2, wherein the second device parameter is a parameter determined on-the-fly.

4. The method of claim 3, wherein the first and second device parameters are processor operating speeds.

5. The method of claim 1 wherein the graphic attribute includes one of a location of the graphic object, a position of display, a size, a zone, a graphic primitive set, an animation primitive set, and a sound set.

6. The method of claim 5, wherein the graphic object is one of a banner, a logo, an advertisement item, and a textual item.

7. The method of claim 5 further comprising:
   initializing a graphic controller to set a display environment; and
   writing the image to a display buffer associated with the graphic controller.

8. The method of claim 5, wherein generating the graphic attribute comprises:
   scanning the template to generate tokens; and
   parsing the tokens to generate the graphic attribute.

9. The method of claim 5, wherein generating the image comprises:
   retrieving the graphic object from the storage based on the graphic attribute; and
   transforming the graphic object to the image based on the graphic attribute.

10. The method of claim 5 wherein the zone includes one of a graphic zone, a textual zone, and an animation zone.

11. The method of claim 5, wherein the storage is a non-volatile writable memory.

12. A computer program product comprising:
a computer usable medium having computer program code embodied therein to display information, the computer program product having:
computer readable program code to retrieve, during a boot period, a first value representative of a first device parameter;
computer readable program code to detect, during the boot period, a second value representative of a second device parameter;
computer readable program code to retrieve a template corresponding to a graphic object from a storage, said template including a plurality of commands;
computer readable program code to generate a graphic attribute based on one or more of said commands from the template, the graphic attribute characterizing the graphic object;
computer readable program code to display said first and second values; and
computer readable program code to generate an image, during a boot period, from the graphic object according to the graphic attribute.

13. The computer program product of claim 12, wherein the first device parameter is a parameter determined at the time of manufacture.

14. The computer program product of claim 13, wherein the second device parameter is a parameter determined on-the-fly.

15. The computer program product of claim 14, wherein the first and second device parameters are processor operating speeds.

16. The computer program product of claim 15, wherein the graphic attribute includes one of a location of the graphic object, a position of display, a size, a zone, a graphic primitive set, an animation primitive set, and a sound set.

17. The computer program product of claim 16, wherein the graphic object is one of a banner, a logo, an advertisement item, and a textual item.

18. The computer program product of claim 16, further comprising:
computer readable program code for initializing a graphic controller to set a display environment; and
computer readable program code for writing the image to a display buffer associated with a graphic controller.

19. The computer program product of claim 16, wherein the computer readable program code for generating the image comprising:
computer readable program code for retrieving the graphic object from the storage based on the graphic attribute; and
computer readable program code for transforming the graphic object to the image based on the graphic attribute.

20. The computer program product of claim 16, wherein the computer readable program code for generating the image comprises:
computer readable program code for retrieving the graphic object from the storage based on the graphic attribute; and
computer readable program code for transform the graphic object to the image based on the graphic attribute.

21. The computer program product of claim 16, wherein the zone includes one of a graphic zone, a textual zone, and an animation zone.

22. The computer program product of claim 16, wherein the storage is a non-volatile writable memory.

23. A system comprising:
a processor; and
a memory coupled to the processor, the memory containing program code to display information, the program code, when executed by the processor, causing the processor to:
retrieve, during a boot period, a first value representative of a first device parameter;
detect, during the boot period, a second value representative of a second device parameter;
retrieve a template corresponding to a graphic object from a storage, said template including a number of commands,
generate a graphic attribute based on one or more of said commands from the template, the graphic attribute characterizing the graphic object,
display said first and second values; and
generate an image, during a boot period, from the graphic object according to the graphic attribute.

24. The system of claim 23, wherein the first device parameter is a parameter determined at the time of manufacture.

25. The system of claim 24, wherein the second device parameter is a parameter determined on-the-fly.

26. The system of claim 25, wherein the first and second device parameters are processor operating speeds.

27. The system of claim 23, wherein the graphic attribute includes one of a location of the graphic object, a position of display, a size, a zone, a graphic primitive set, an animation primitive set, and a sound set.

28. The system of claim 27, wherein the graphic object is one of a banner, a logo, an advertisement item, and a textual item.

29. The system of claim 27, wherein the program code when executed by the processor further causes the processor to:
initialize a graphic controller to set a display environment; and
write the image to a display buffer associated with a graphic controller.

30. The system of claim 27, wherein the program code causing the processor to generate the graphic attribute by:
scanning the template to generate tokens; and
parsing the tokens to generate the graphic attribute.

31. The system of claim 27, wherein the program code causing the processor to generate the image by:
retrieving the graphic object from the storage based on the graphic attribute; and
transforming the graphic object to the image based on the graphic attribute.

32. The system of claim 27, wherein the zone includes one of a graphic zone, a textual zone, and an animation zone.

33. The system of claim 27, wherein the storage is a non-volatile writable memory.

34. The method of claim 1, wherein retrieving the template corresponding to the graphic object comprises retrieving, during a boot period, the template corresponding to the graphic object from the storage, said template including the plurality of commands.

35. The method of claim 1, wherein said plurality of commands specify a graphic operation to be performed by a graphics controller.

36. The method of claim 1, wherein each of said plurality of commands are comprised of a command code and a command information, said command code to indicate a type of graphic operation to be performed by a graphic controller, said graphic controller to use said command information in performing said command code.

37. The method of claim 8, wherein said scanning the template to generate tokens comprises performing a lexicographic analysis on the template to generate said tokens.

38. The method of claim 1, wherein the boot period is one of a BIOS boot-up period and a power-on reset period.

39. The computer program product of claim 12, wherein the boot period is one of a BIOS boot-up period and a power-on reset period.

40. The system of claim 23, wherein the boot period is one of a BIOS boot-up period and a power-on reset period.

41. A method to display information comprising:
   retrieving, during a pre-boot period, a first value representative of a device parameter of a computer system device, where said first value is provided by a manufacturer of the computer system device;
   detecting, during the pre-boot period, a second value representative of the device parameter, said second value being representative of an actual performance level of the computer system device;
   retrieving a template corresponding to a graphic object from a storage, said template including a plurality of commands;
   generating a graphic attribute based on one or more of said commands from the template, the graphic attribute characterizing the graphic object;
   displaying said first and second values; and
   generating an image from the graphic object according to the graphic attribute.

42. The method of claim 41, wherein the first device parameter is a parameter determined at the time of manufacture.

43. The method of claim 42, wherein the second device parameter is a parameter determined on the fly.

44. The method of claim 43, wherein the first and second device parameters are processor operator speeds.

45. The method of claim 41 wherein the graphic attribute includes one of a location of the graphic object, a position of display, a size, a zone, a graphic primitive set, an animation primitive set, and a sound set.

46. The method of claim 45, wherein the graphic object is one of a banner, a logo, an advertisement item, and a textual item.

47. The method of claim 45 further comprising:
   initializing a graphic controller to set a display environment; and
   writing the image to a display buffer associated with the graphic controller.

48. The method of claim 45, further comprising:
   scanning the template to generate tokens; and
   parsing the tokens to generate the graphic attribute.

49. The method of claim 45, wherein generating the image comprises:
   retrieving the graphic object from the storage based on the graphic attribute; and
   transforming the graphic object to the image based on the graphic attribute.

50. The method of claim 45 wherein the zone includes one of a graphic zone, a textual zone, and an animation zone.

51. A system comprising:
   a processor; and
   a memory coupled to the processor, the memory containing program code to display information, the program code, when executed by the processor, causing the processor to:
      retrieve, during a pre-boot period, a first value representative of a device parameter of a computer system device, where said first value is provided by a manufacturer of the computer system device;
      detect, during the pre-boot period, a second value representative of the device parameter, said second value being representative of an actual performance level of the computer system device;
      retrieve a template corresponding to a graphic object from a storage, said template including a number of commands,
      generate a graphic attribute based on one or more of said commands from the template, the graphic attribute characterizing the graphic object,
      display said first and second values; and
      generate an image from the graphic object according to the graphic attribute.

52. The system of claim 51, wherein the first device parameter is a parameter determined at the time of manufacture.

53. The system of claim 52, wherein the second device parameter is a parameter determined on the fly.

54. The system of claim 53, wherein the first and second device parameters are processor operator speeds.

55. The system of claim 51 wherein the graphic attribute includes one of a location of the graphic object, a position of display, a size, a zone, a graphic primitive set, an animation primitive set, and a sound set.

56. The system of claim 55, wherein the graphic object is one of a banner, a logo, an advertisement item, and a textual item.

57. The system of claim 55, wherein the program code further causes the processor to:
   initialize a graphic controller to set a display environment; and
   write the image to a display buffer associated with the graphic controller.

58. The system of claim 55, wherein the program code further causes the processor to:
   scan the template to generate tokens; and
   parse the tokens to generate the graphic attribute.

59. The system of claim 55, wherein the program code causes the processor to generate the image by:
   retrieving the graphic object from the storage based on the graphic attribute; and
   transforming the graphic object to the image based on the graphic attribute.

60. The method of claim 55 wherein the zone includes one of a graphic zone, a textual zone, and an animation zone.

* * * * *